(12) United States Patent
Watarai et al.

(10) Patent No.: US 10,036,465 B2
(45) Date of Patent: Jul. 31, 2018

(54) BICYCLE COMPONENT

(71) Applicant: Shimano Inc., Sakai, Osaka (JP)

(72) Inventors: Etsuyoshi Watarai, Osaka (JP);
Yusuke Nishikawa, Osaka (JP);
Shinichiro Noda, Osaka (JP)

(73) Assignee: Shimano Inc., Osaka (JP)

( * ) Notice: Subject to any disclaimer, the term of this patent is extended or adjusted under 35 U.S.C. 154(b) by 78 days.

(21) Appl. No.: 15/190,864

(22) Filed: Jun. 23, 2016

(65) Prior Publication Data

US 2017/0016526 A1 Jan. 19, 2017

(30) Foreign Application Priority Data

Jul. 17, 2015 (JP) ................. 2015-143482
Nov. 17, 2015 (JP) ................. 2015-225010

(51) Int. Cl.
| | |
|---|---|
| H02K 7/14 | (2006.01) |
| F16H 57/025 | (2012.01) |
| B62M 6/55 | (2010.01) |
| B62K 19/34 | (2006.01) |
| F16B 43/00 | (2006.01) |
| F16B 5/02 | (2006.01) |
| F16B 39/34 | (2006.01) |

(52) U.S. Cl.
CPC .......... F16H 57/025 (2013.01); B62K 19/34 (2013.01); B62M 6/55 (2013.01); *F16B 5/0233* (2013.01); *F16B 39/34* (2013.01); *F16B 43/009* (2013.01)

(58) Field of Classification Search
CPC ......... F16H 57/025; B62K 19/34; B62M 6/55

USPC ....................................................... 180/206.4
See application file for complete search history.

(56) References Cited

U.S. PATENT DOCUMENTS

| | | | | |
|---|---|---|---|---|
| 5,845,727 | A * | 12/1998 | Miyazawa | B62M 6/55 180/206.4 |
| 2014/0210318 | A1* | 7/2014 | Yao | H02K 7/14 310/67 R |
| 2016/0107721 | A1* | 4/2016 | Urabe | B62M 6/55 475/4 |
| 2016/0288872 | A1* | 10/2016 | Shahana | B62M 6/55 |
| 2017/0057582 | A1* | 3/2017 | Nishikawa | B62M 6/55 |
| 2017/0137087 | A1* | 5/2017 | Watarai | B62M 6/45 |

FOREIGN PATENT DOCUMENTS

| | | |
|---|---|---|
| DE | 20 2011 106258 U1 | 2/2012 |
| JP | 10 16870 A | 1/1998 |
| JP | 10 16872 A | 1/1998 |
| JP | 10 316075 A | 12/1998 |
| JP | 2000 62679 A | 2/2000 |

(Continued)

*Primary Examiner* — Tony H Winner
(74) *Attorney, Agent, or Firm* — Global IP Counselors, LLP

(57) ABSTRACT

A bicycle component is provided that is capable of suppressing rattling against a frame. The bicycle component includes a housing, a first attaching part and an adjustment member. The housing is configured to rotatably support a crankshaft. The first attaching part is provided to the housing and configured to be attached to a frame. The adjustment member has at least a portion which is configured to be disposed in a gap that is formed between the first attaching part and the frame while in a state in which the first attaching part is attached to the frame.

32 Claims, 20 Drawing Sheets

(56) References Cited

FOREIGN PATENT DOCUMENTS

| | | |
|---|---|---|
| JP | 2000 168663 A | 6/2000 |
| JP | 4416620 B2 | 2/2010 |
| WO | 2012 025444 A1 | 3/2012 |
| WO | 2013 050193 A1 | 4/2013 |

* cited by examiner

【図27】

BICYCLE COMPONENT

CROSS-REFERENCE TO RELATED APPLICATIONS

This application claims priority to Japanese Patent Application No. 2015-143482, filed on Jul. 17, 2015, and Japanese Patent Application No. 2015-225010, filed on Nov. 17, 2015. The entire disclosures of Japanese Patent Application No. 2015-143482 and Japanese Patent Application No. 2015-225010 are hereby incorporated herein by reference.

BACKGROUND

Field of the Invention

The present invention generally relates a bicycle component.

Background Information

One example of a bicycle component is a drive unit, which includes a motor that assists a manual drive force that is applied to a crankshaft. A drive unit is disclosed in Japanese Patent No. 4,416,620, which comprises an attaching part that can be attached to a bracket provided to a bicycle frame. Here, the drive unit is affixed to the bracket by the attaching part being inserted between a pair of side plate portions, which comprises the bracket, and the side plate portions and the attaching part being affixed by a bolt.

SUMMARY

Generally, the present disclosure is directed to various features of bicycle component that is configured to be attached to a bicycle frame.

According to the drive unit described in the above mentioned Japanese Patent, a gap can be formed due to manufacturing error between the attaching part and the side plate portions, which are bolted together. In this case, there is a possibility that the drive unit will rattle against the side plate portions during riding of the bicycle. It has been discovered that this same rattling problem can exists in any bicycle component that is attached to the bicycle frame as the problem described above exists.

One object of the present invention is to provide a bicycle component that is capable of suppressing rattling against the bicycle frame.

In view of the state of the known technology and in accordance with a first aspect of the present disclosure, a bicycle component according to the present invention comprises a housing, a first attaching part and an adjustment member. The housing is configured to rotatably support a crankshaft. The first attaching part is coupled to the housing and configured to be attached to a frame. The adjustment member has at least a portion which is configured to be disposed in a gap that is formed between the first attaching part and the frame while in a state in which the first attaching part is attached to the frame.

According to one example of the bicycle component, the adjustment member is a washer.

According to one example of the bicycle component, the first attaching part has a bore, and the first attaching part is configured to be attached to the frame by a bolt that is disposed in the bore of the first attaching part.

According to one example of the bicycle component, the bore of the first attaching part includes a female thread that threadedly engages a thread of the bolt.

According to one example of the bicycle component, the bolt is dimensioned to be inserted in the washer.

According to one example of the bicycle component, the washer is a tapered washer.

According to one example of the bicycle component, the tapered washer has an elongated opening that extends in a tapering direction of the tapered washer.

According to one example of the bicycle component, the tapered washer has a first inclined surface that contacts one of the first attaching part and the frame.

According to one example of the bicycle component, the first inclined surface is textured to increase a friction resistance of the first inclined surface of the tapered washer.

According to one example of the bicycle component, the first attaching part has a second inclined surface that contacts the first inclined surface of the tapered washer.

According to one example of the bicycle component, the second inclined surface is textured to increase a friction resistance of the second inclined surface of the first attaching part.

According to one example of the bicycle component, the adjustment member is adjustably supported to the first attaching part to change a protrusion amount of the adjustment member from the first attaching part.

According to one example of the bicycle component, the adjustment member has one of a male thread and a female thread, and the first attaching part has the other of the male thread and the female thread, which is coupled to the one of the male thread and the female thread of the adjustment member.

According to one example of the bicycle component, the first attaching part includes a supporting portion which has a male thread on an outer peripheral, and the adjustment member includes a nut having a female thread.

According to one example of the bicycle component, the first attaching part has a bore, and the first attaching part is configured to be attached to the frame by a bolt that is disposed in the bore.

According to one example of the bicycle component, the adjustment member has a bore in which the bolt can be inserted.

According to one example of the bicycle component, the bore of the first attaching part includes a female thread that threadedly engages a thread of the bolt.

According to one example of the bicycle component, the first attaching part has an insertion bore, and the adjustment member is press-fitted into the insertion bore of the first attaching part.

According to one example of the bicycle component, the adjustment member has a bore, and the first attaching part is configured to be attached to the frame by a bolt that is disposed in the bore of the adjustment member.

According to one example of the bicycle component, the bore of the adjustment member includes a female thread that threadedly engages a thread of the bolt.

According to one example of the bicycle component, the adjustment member has an outer periphery with an a suppression portion that suppresses movement of the adjustment member relative to the first attaching part.

According to one example of the bicycle component, the suppression portion includes knurling that is formed on the outer periphery of the adjustment member has a holding portion that is held by the first attaching part, and a flange portion that is provided to an end of the holding portion. The flange portion is disposed in the gap that is formed between the first attaching part and the frame.

According to one example of the bicycle component, the first attaching part further has a recess that is configured to receive the flange portion.

According to one example of the bicycle component, the first attaching part has an insertion bore, and the holding portion of the adjustment member is press-fitted into the insertion bore of the first attaching part.

According to one example of the bicycle component, the insertion bore of the first attaching part has a first portion to which the adjustment member is press-fitted, and a second portion having a smaller inner diameter than an inner diameter of the first portion, the second portion has a female thread.

According to one example of the bicycle component, the adjustment member has a bore, the first attaching part is configured to be attached to the frame by a bolt that is disposed in the bore of the adjustment member, the inner diameter of the second portion is smaller than an inner diameter of the bore of the adjustment member, and the second portion has a female thread within the bore of the adjustment member when viewed from an axial direction of the bolt.

One example of the bicycle component further comprises a second attaching part provided to the housing and configured to be attached to the frame in a position that is different from the first attaching part with respect to a direction parallel to an axis of the crankshaft.

According to one example of the bicycle component, at least a portion of the adjustment member is disposed on an opposite side of the second attaching part relative to the first attaching part with respect to the direction parallel to the axis of the crankshaft.

According to one example of the bicycle component, the housing rotatably supports an output rotating body which is disposed outside the housing and which transmits rotation of the crankshaft to a rear wheel, and the second attaching part is provided closer to the output rotating body than the first attaching part with respect to the direction parallel to the axis of the crankshaft.

One example of the bicycle component further comprises a motor that assists a manual drive force that is applied to the crankshaft.

One example of the bicycle component further comprises a transmission that changes a transmission ratio of the bicycle.

According to an above-described bicycle component, rattling against a frame can be suppressed.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
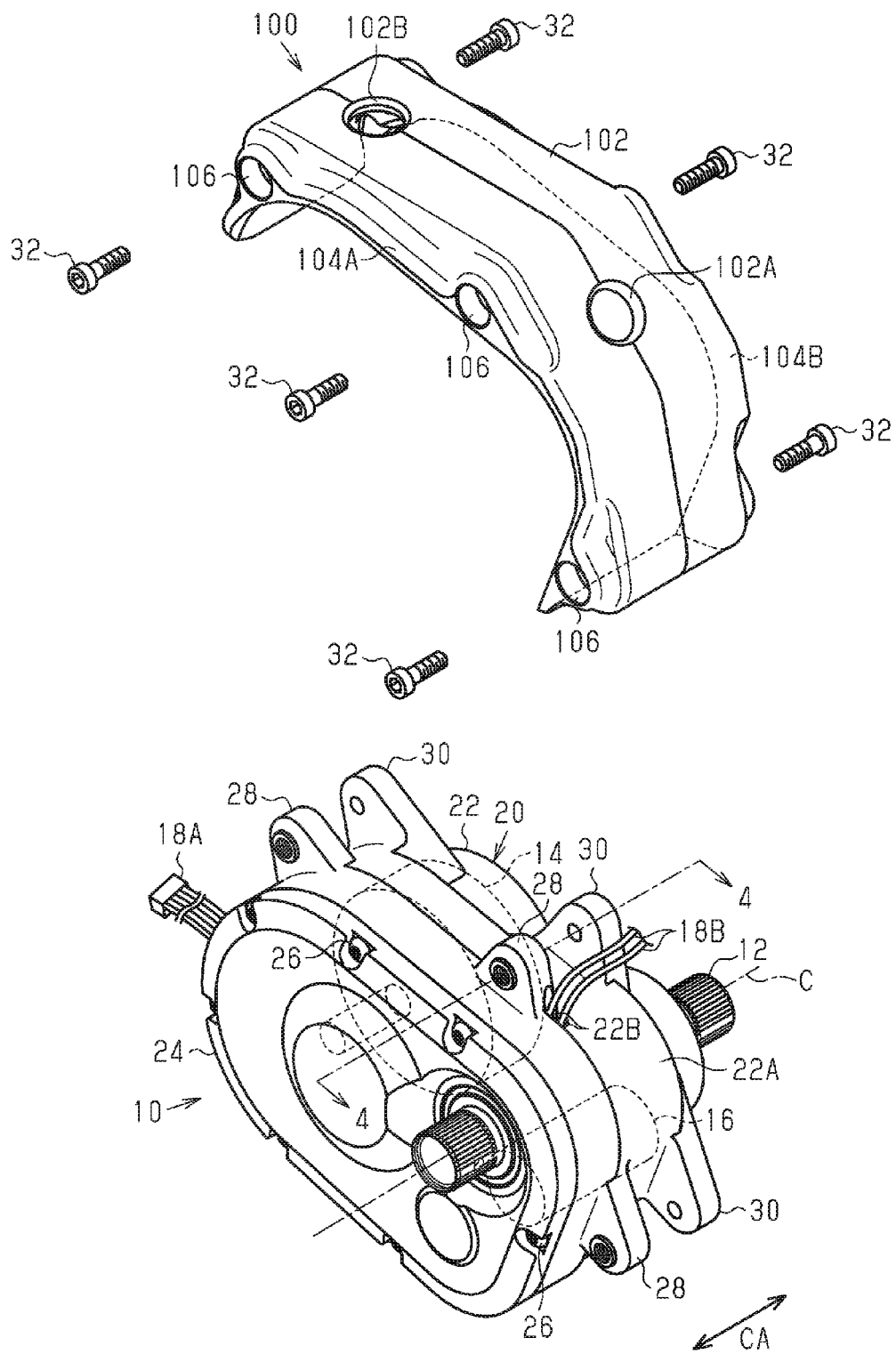
FIG. 1 is an exploded perspective view of a drive unit (e.g., a bicycle component) and a bracket (e.g., a frame) in accordance with a first embodiment.

As shown in FIG. 1, a drive unit 10 is configured to be attached to a bracket 100, which is a part of a bicycle frame of a bicycle. The drive unit 10 is one example of a bicycle component. The bracket 100 is one example of an attachment structure between the drive unit 10 and a bicycle frame. The drive unit 10 basically comprises a crankshaft 12 and a housing 20. The housing 20 is configured to rotatably support the crankshaft 12. The bracket 100 is affixed to, for example, a down tube or a seat tube of a bicycle frame. Alternatively, the bracket 100 can be connected to a chain stay of a bicycle frame. The crankshaft 12 extends through the housing 20 such that the free ends of the crankshaft 12 protrude from both sides of the housing 20 in a lateral direction of a bicycle.

A motor 14 and a control circuit (not shown) are housed inside the housing 20. The motor 14 is operatively coupled to the crankshaft 12 for assisting a manual drive force that is applied to the crankshaft 12 via a crank assembly (not shown). The control circuit is configured to control the motor 14 in a conventional manner. An output unit (not shown) is provided to the housing 20. A front sprocket can be attached to the output unit. The output unit is preferably coaxially disposed with the crankshaft 12. The motor 14 can apply an assisting force to a drive force transmission path between the crankshaft 12 and the output unit via a decelerator. The drive unit 10 further comprises a transmission 16, which changes the rotational speed of the crankshaft 12 and transmits the drive torque to the output unit. Thus, the drive unit 10 performs a function of assisting a manual drive force and a function of changing the gear ratio of the bicycle. The transmission 16 can be configured by a plurality of gears that are selectively combined, a planetary gear mechanism, or by a plurality of sprockets and a chain.

The drive unit 10 can have one or more electrical wirings connected thereto. In the first embodiment, the drive unit 10 has a first wiring 18A and a second wiring 18B connected thereto. The first wiring 18A and the second wiring 18B each comprise a plurality of electric wires. For example, the first wiring 18A can comprise an electric wire that is configured to be electrically connected to a battery holder. The second wiring 18B can comprise a first electrical cable that can be electrically connected to a display device of a bicycle, a second electrical cable that can be electrically connected to an electric transmission that is provided to a rear wheel or in the vicinity of a rear wheel, and a third electrical cable that can be electrically connected to a headlamp. Each electrical cable transmits electric power and/or signals. The first wiring 18A and the second wiring 18B are electrically connected the control circuit of the motor 14.

The housing 20 comprises a housing main body 22 and the cover 24. The shape of the housing main body 22 is a box shape. One side of the housing main body 22 is opened in a direction parallel to an axis C of the crankshaft 12 (hereinafter referred to as "crankshaft direction CA"). At least a portion of the motor 14, a portion of the first wiring 18A, and a portion of the second wiring 18B are housed in the housing main body 22. The cover 24 closes the side opening of the housing main body 22. The cover 24 is affixed to the housing main body 22 by, for example, a bolt 26. Only a portion of the crankshaft 12 of the motor 14 can be housed in the housing main body 22. A connector can be provided to the housing main body 22 for electrically connecting the control circuit of the motor 14. The first wiring 18A and the second wiring 18B can be detachably connected to the control circuit via the connector that is provided to the housing main body 22. When providing the connector to the housing main body 22, it is preferable to cover the connector by a cover that is different and distinct from the cover 24.

The drive unit 10 comprises a plurality of first attaching part 28 and a plurality of second attaching part 30. The first attaching parts 28 are coupled to the housing 20 and configured to be attached to a frame of a bicycle via the bracket 100. The second attaching parts 30 are configured to be attached to a frame of a bicycle via the bracket 100 in a position that is different from the first attaching part 28 in the crankshaft direction CA. The first attaching parts 28 and the second attaching parts 30 are respectively provided to the drive unit 10. In particular, the first attaching parts 28 and the second attaching parts 30 are integrally formed with the housing 20.

In the first embodiment, three of the first attaching parts 28 and three of the second attaching parts 30 are provided to the housing 20. The first attaching parts 28 and the second attaching parts 30 form pairs, and protrude outwardly from side walls 22A of the housing main body 22. The first attaching parts 28 are positioned on the cover 24 side in the crankshaft direction CA, and the first second attaching parts 30 are positioned at an interval on the opposite side from the cover 24 with respect to the first attaching parts 28, in the crankshaft direction CA. The first attaching parts 28 and the second attaching parts 30 are positioned at intervals in a circumferential direction around the crankshaft direction CA of the housing 20.

The housing 20 has an open portion 22B from which the second wiring 18B extends out of the housing 20. For example, the open portion 22B is formed in a proximal end portion of one of the first attaching part 28 that is located at an intermediate position with respect to a circumferential direction around the crankshaft direction CA of the housing 20. The open portion 22B has a plurality of (two) openings that correspond to each of the electrical cables of the second wiring 18B. Each electrical cable is arranged to pass through a corresponding one of the openings, and a seal member is provided to each opening for suppressing intrusion of water and the like into the housing between the housing 20 and the electrical cable.

The drive unit 10 is configured to be attached to the bracket 100 by a plurality of bolts 32. The bracket 100 includes and a pair of flanges 104A and 104B. The top wall 102 is configured and dimensioned to cover a top area of the drive unit 10. The flanges 104A and 104B extend from the top wall 102 so as to be adjacent the first attaching part 28 and the second attaching part 30 with respect to the crankshaft direction CA when the drive unit 10 is attached to the bracket 100. Alternatively, the top wall 102 of the bracket 100 can be omitted, and the first flange 104A and the second flange 104B can be formed individually.

The top wall 102 has a first hole 102A and a second hole 102B. The first hole 102A and the second hole 102B are spaced apart from each other with respect to a longitudinal direction of the bicycle frame. The first hole 102A is connected to the interior of a down tube of the bicycle frame. The second hole 102B is connected to the interior of a seat tube of the bicycle frame.

The first flange 104A has a plurality of through-holes 106 located in positions that oppose the first attaching parts 28 with respect to the crankshaft direction CA. Similarly, the second flange 104B has a plurality of through-holes (not shown) located in positions that oppose the second attaching parts 30 with respect to the crankshaft direction CA. When there is a plurality of the first attaching parts 28, a plurality of pairs of the first flanges 104A can be provided that are spaced apart from each other in a direction in which the first attaching parts 28 are separated. Also when there is a plurality of the first flanges 104A, a through-hole is formed in each of the first flanges 104A. When there is a plurality of the second attaching parts 30, a plurality of pairs of the second flanges 104B can be provided that are spaced apart from each other in a direction in which the second attaching parts 30 are separated. When there is a plurality of the second flanges 104B, a through-hole is formed in each of the second flanges 104B.

Figure 2:
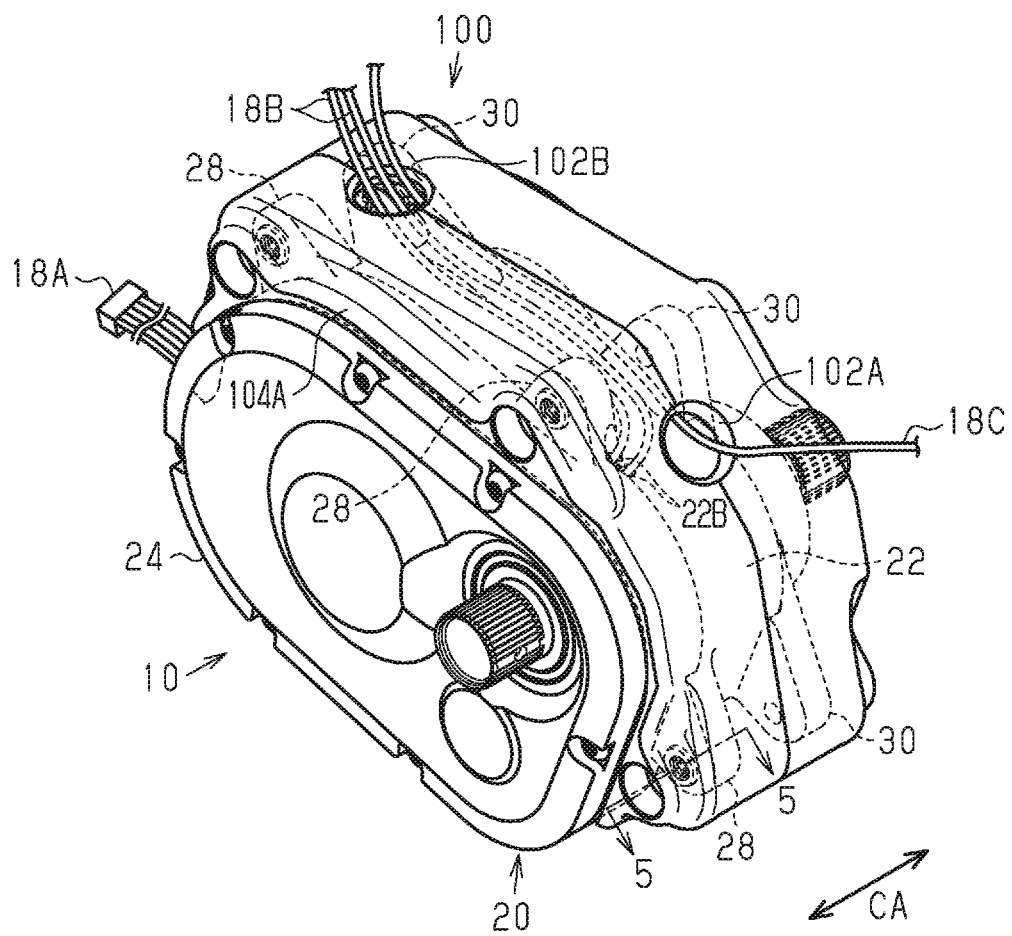
FIG. 2 is a perspective view of the drive unit and the bracket illustrated in FIG. 1 in which the drive unit has been coupled to the bracket.

As shown in FIG. 2, the first flange 104A covers each of the first attaching parts 28 from the outside with respect to the crankshaft direction CA, and the second flange 104B (refer to FIG. 1) covers the second attaching part 30 from the outside with respect to the crankshaft direction CA. That is, the first attaching part 28 and the second attaching part 30 are disposed between the first flange 104A and the second flange 104B. The outer end surface of the first flange 104A in the crankshaft direction CA is preferably positioned closer to the center of the housing 20 in the crankshaft direction CA, than the outer surface of the housing 20 in the crankshaft direction CA. The outer end surface of the second flange 104B in the crankshaft direction CA is preferably positioned closer to the center of the housing 20 in the crankshaft direction CA, than the outer surface of the housing 20 in the crankshaft direction CA.

In a state in which the drive unit 10 is attached to the bracket 100, the second wiring 18B which is drawn from the open portion 22B can be arranged so as to pass between the first attaching parts 28 and the second attaching parts 30 with respect to the crankshaft direction CA. The second wiring 18B extends in the circumferential direction around the crankshaft direction CA of the housing 20, and is drawn to the outside from a space that is formed between the bracket 100 and the drive unit 10 by passing through the second hole 102B of the bracket 100. The second wiring 18B can be disposed so as to pass through the internal space of a frame.

A third wiring 18C can be disposed in the space between the bracket 100 and the housing 20. The third wiring 18C is disposed between the bracket 100 and the housing 20, for example, through the first hole 102A and the second hole 102B. The third wiring 18C comprises, for example, a brake cable, a gear shift cable, and the like. The third wiring 18C is disposed between the first attaching part 28 and the second attaching part 30 in the crankshaft direction CA, and extends in the circumferential direction around the crankshaft direction CA of the housing 20, in the same way as the second wiring 18B.

Figure 3:
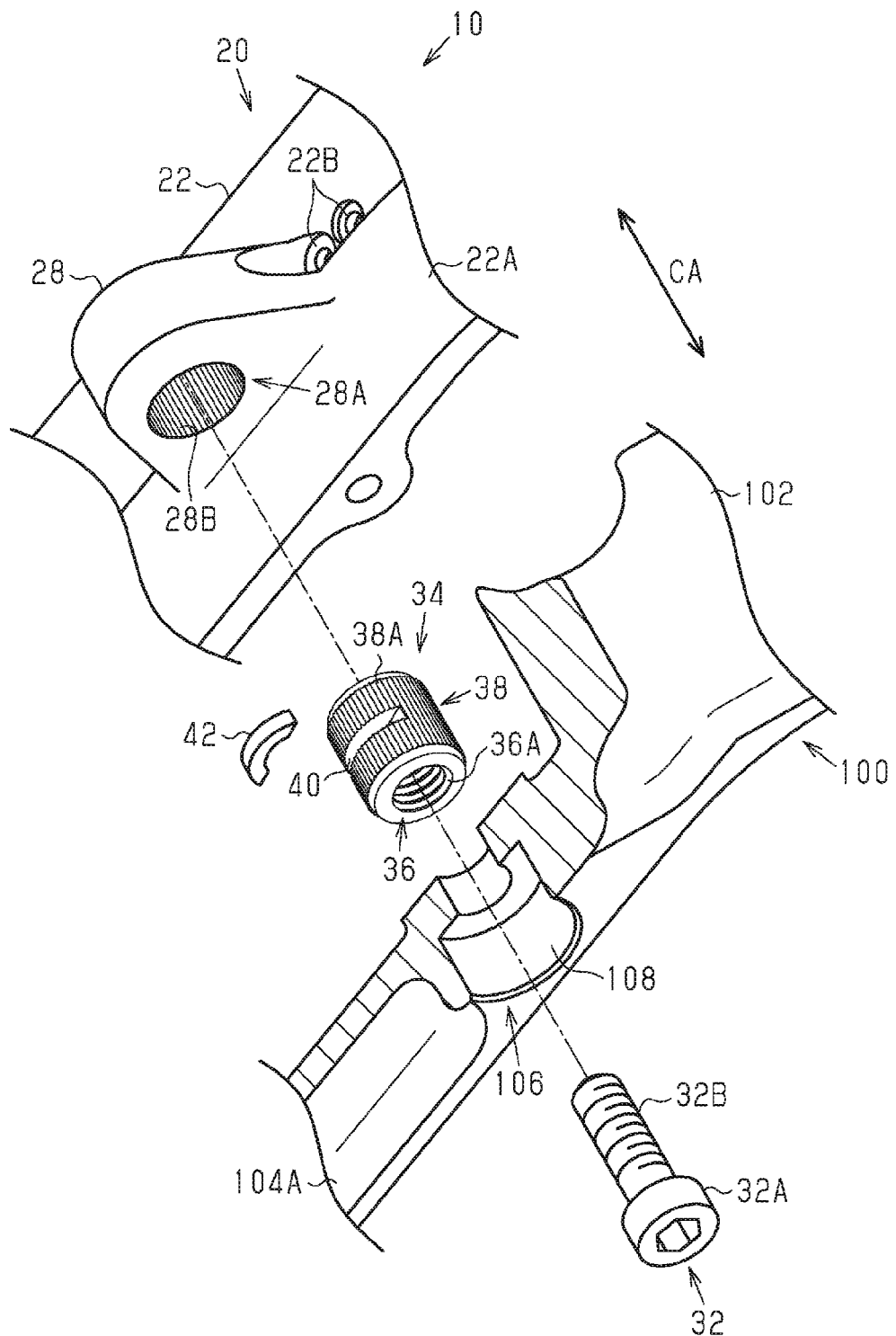
FIG. 3 is an exploded perspective view of a portion of the bracket and a portion of the first attaching part illustrated in FIG. 1.

As shown in FIG. 3, the first attaching part 28 has an insertion bore 28A that extends through the first attaching part 28 in the crankshaft direction CA. The insertion bore 28A is preferably provided with knurling 28B which extends in the crankshaft direction CA.

The drive unit 10 comprises an adjustment member 34. At least a portion of the adjustment member 34 is disposed in a gap that is formed between the first attaching part 28 and the bracket 100 while in a state in which the first attaching part 28 is attached to the bracket 100. In the first embodiment, the adjustment member 34 is press-fitted into the insertion bore 28A of the first attaching part 28. Thus, the adjustment member 34 is frictionally retained in a prescribed position with respect to the first attaching part 28. The adjustment member 34 can be made of metal, or made of synthetic resin. The shape of the adjustment member 34 is preferably cylindrical shape. However, the outer cross sectional shape can be polygonal as long as the shape is tubular. The adjustment member 34 has a bore 36 in which the one of the bolts 32 can be inserted. A female thread 36A that can be coupled to the bolt 32 is formed in the bore 36 of the adjustment member 34. The outer periphery of the adjustment member 34A has a suppression portion 38 that suppresses the movement of the adjustment member 34 relative to the first attaching part 28. The suppression portion 38 includes knurling 38A that is formed on the outer periphery of the adjustment member 34. The knurling 38A extends in the crankshaft direction CA. Accordingly, when the adjustment member 34 is press-fitted in the insertion bore 28A, rotation of the adjustment member 34 around the axis can be suppressed.

Further, the outer periphery of the adjustment member 34 has a slit 40 that extends in the circumferential direction of the adjustment member 34 around the axis of the adjustment member 34. The slit 40 extends in a radial direction of the adjustment member 34 from the outer periphery to the inner periphery of the adjustment member 34. The adjustment member 34 comprises a locking member 42 that is disposed in the slit 40. The locking member 42 is formed from a material having a lower hardness than the hardness of the adjustment member 34. The locking member 42 is, for example, made of resin. The shape of the locking member 42 is formed so as to plug the slit 40, and is formed, for example, in a circular arc shape. The locking member 42 can be press-fitted in the slit 40 of the adjustment member 34, or, bonded to the adjustment member 34 by an adhesive. The locking member 42 is preferably formed of a deformable material. The thickness of the locking member 42 in the radial direction of the adjustment member 34 is formed to be larger than the depth of the slit in the radial direction of the adjustment member 34.

Figure 4:
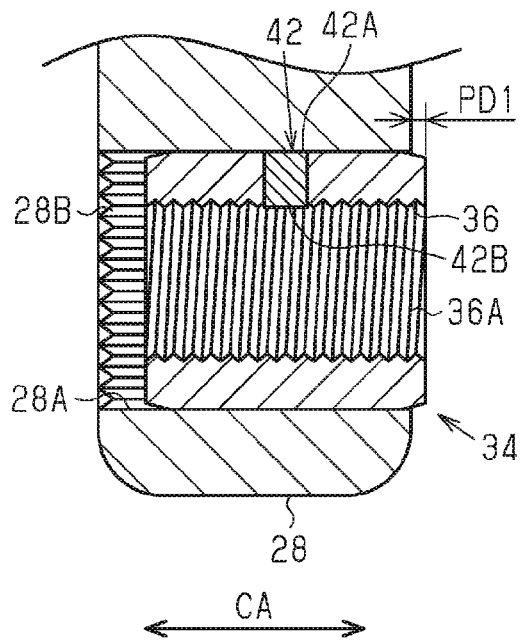
FIG. 4 is a partial cross sectional view of the drive unit and the bracket as seen along section line 4-4 in FIG. 1.
Figure 5:
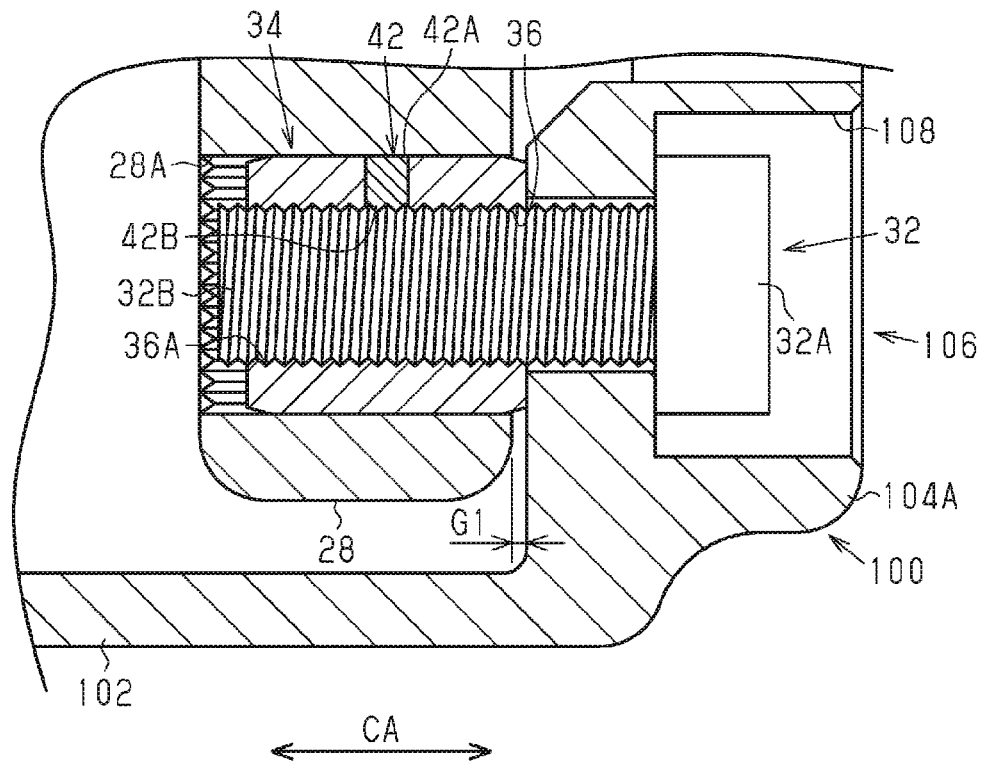
FIG. 5 is a partial cross sectional view of the drive unit and the bracket as seen along section line 5-5 in FIG. 2.

As shown in FIG. 4, the adjustment member 34 protrudes from the first attaching part 28 in the crankshaft direction CA, so that the end surface thereof in the crankshaft direction CA comes in contact with the first flange 104A of the bracket 100 (both refer to FIG. 5). That is, at least a portion of the adjustment member 34 is disposed on the opposite side of the second attaching part 30 (refer to FIG. 1) relative to the first attaching part 28, in the crankshaft direction CA.

An outer peripheral surface 42A of the locking member 42 comes in contact with the insertion bore 28A while in a state in which the adjustment member 34 is press-fitted into the insertion bore 28A of the first attaching part 28. An inner peripheral surface 42B of the locking member 42 is disposed in the same position as a female thread 36A of the adjustment member 34 in a radial direction of the adjustment member 34, or, slightly protruding from the inner peripheral surface of the female thread 36A.

As shown in FIG. 5, each of the first attaching parts 28 can be attached to the bracket 100 by one of the bolts 32, which is inserted in the bore 36 of the adjustment member 34. Specifically, the bolt 32 is screwed to the adjustment member 34 in a state in which the end surface of the adjustment member 34 in the crankshaft direction CA comes in contact with the first flange 104A of the bracket 100, or, while in a state in which the gap that is formed between the end surface of the adjustment member 34 in the crankshaft direction CA and the first flange 104A is small. At this time, the bolt 32 is inserted in a through-hole 106 of the first flange 104A. A bolt head 32A of the bolt 32 is housed in a housing portion 108, which is a portion of the through-hole 106 that is radially enlarged. A male thread 32B of the bolt 32 is screwed to the female thread 36A of the adjustment member 34. Further, the male thread 32B bites into an inner peripheral surface 42B of the locking member 42. That is, the male thread 32B bites into the locking member 42 in a state in which the inner peripheral surface 42B of the locking member 42 is plastically deformed. In this manner, the material of the locking member 42 can be any material with which the male thread 32B of the bolt 32 can bite into the locking member 42, and can be, for example, made of aluminum in addition to resin.

Next, the attachment procedure of the drive unit 10 to the bracket 100 will be described with reference to FIGS. 6 to 9.

Figure 7:
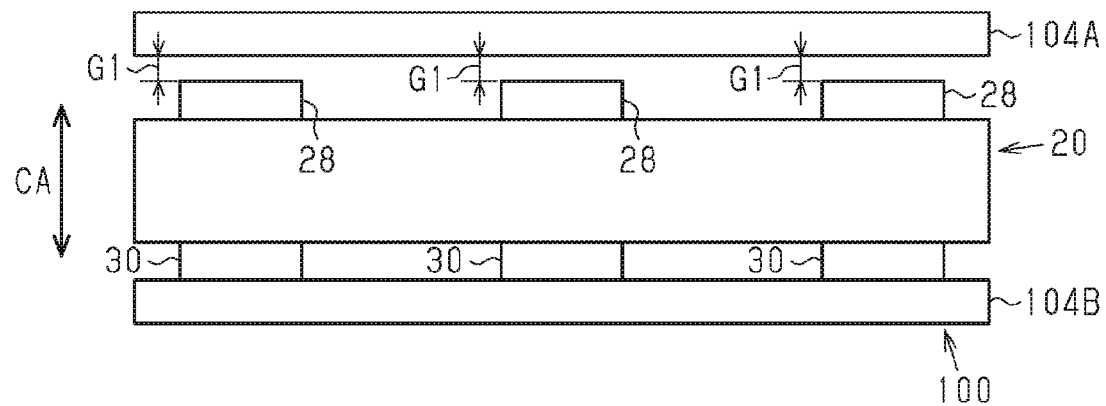
FIG. 7 is a schematic view of the housing of the drive unit and the bracket in which the drive unit is temporarily disposed in the bracket in accordance with the procedure of Steps S1 and S2 in FIG. 6.
Figure 8:
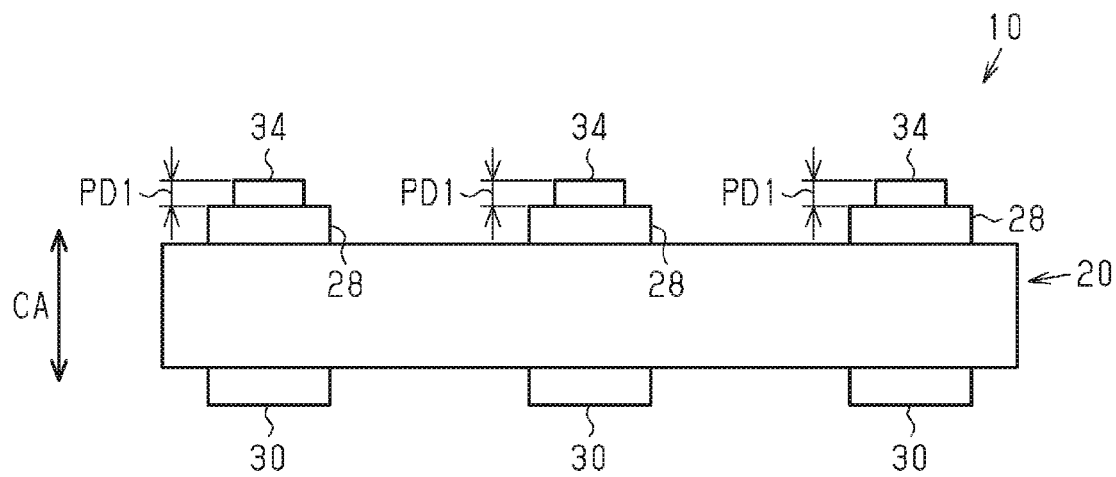
FIG. 8 is a schematic view of the housing of the drive unit with the adjusting members being attached to first attaching parts in accordance with the procedure of Step S3 in FIG. 6.
Figure 9:
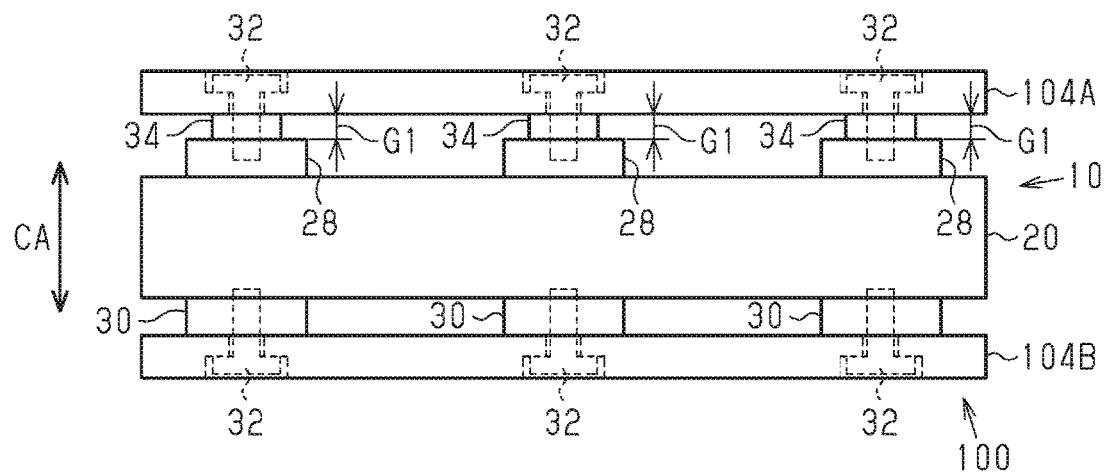
FIG. 9 is a schematic view the housing of the drive unit and the bracket being attached in accordance with the procedure of Steps S4 and S5 in FIG. 6.

Meanwhile, FIGS. 7 to 9 are schematic views that show the drive unit 10 or the relationship between the drive unit 10 and the bracket 100. Further, the shapes of the drive unit 10 and the bracket 100 shown in FIGS. 7 to 9 are shown to differ from the shapes of the drive unit 10 and the bracket 100 in FIGS. 1 to 5, for convenience of description. Further, a gap G1 between the drive unit 10 and the bracket 100 shown in FIG. 7, and, a protrusion amount PD1 of the adjustment member 34 from the first attaching part 28 shown in FIG. 8, are shown to be greater compared to FIGS. 1, 4 and 5, for convenience of description.

Figure 6:
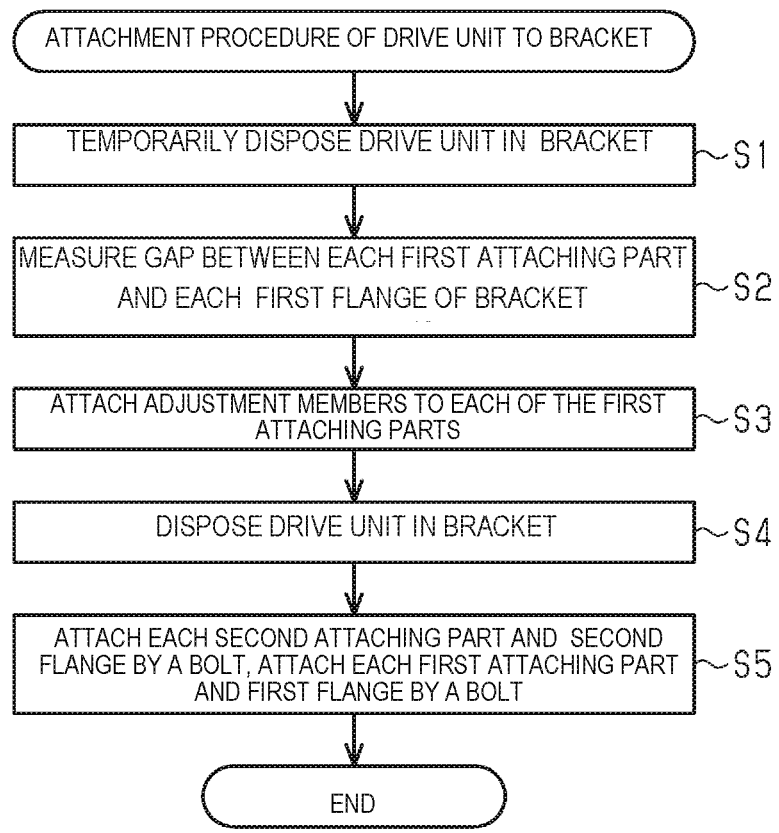
FIG. 6 is a flowchart showing an attachment procedure for attaching the drive unit to the bracket in accordance with the first embodiment.

As shown in FIG. 6, the attachment procedure of the drive unit 10 to the bracket 100 comprises a first Step S1, a second Step S2, a third Step S3, a fourth Step S4, and a fifth Step S5.

As shown in FIG. 7, in the first Step S1, the drive unit 10 is temporarily disposed in the bracket 100. Specifically, a drive unit in a state before the adjustment member 34 (refer to FIG. 8) is attached is disposed in a state of being placed closer to one side of the bracket 100 in the crankshaft direction CA, so that three second attaching parts 30 are in contact with the second flange 104B.

As shown in FIG. 7, in the second Step S2, the gap G1 formed between each first attaching part 28 and the first flange 104A is measured. After the gap G1 is measured, a drive unit in a state before the adjustment member 34 is attached is taken out from the bracket 100.

As shown in FIG. 8, in the third Step S3, the adjustment members 34 are attached to each of the first attaching parts 28. The adjustment members 34 that are attached to the first attaching parts 28 are adjusted so that the protrusion amount PD1 from each of the first attaching parts 28 in the crankshaft direction CA becomes the gap G1 (refer to FIG. 7). The protrusion amount PD1 can be smaller than the gap G1, if within the range of greater than "zero" and less than or equal to the gap G1.

As shown in FIG. 9, in the fourth Step S4, the drive unit 10 is disposed to the bracket 100. At this time, each of the second attaching parts 30 of the drive unit 10 will be in a state of contacting the second flange 104B, and each of the adjustment members 34 will be in a state of contacting the first flange 104A. Meanwhile, each of the adjustment members 34 can be disposed with a slight gap with respect to the first flange 104A in the crankshaft direction CA.

Then, as shown in FIG. 9, in the fifth Step S5, the second attaching parts 30 are attached to the second flange 104B by three of the bolts 32, and the first attaching parts 28 are also attached to the first flange 104A by three of the bolts 32.

Here, the adjustment members 34 are attached to the first attaching parts 28 during assembly. However, the adjustment members 34 can be attached to the first attaching parts 28 in advance. The adjustment members 34 are, for example, kept in a state in which only half thereof is inserted in the axial direction. When attaching the drive unit 10 to the bracket 100, a distance A between the first flange 104A and the second flange 104B is measured, and the adjustment members 34 are press-fitted to the first attaching parts 28 so that a distance B between the end surfaces of the adjustment members 34 on the opposite side of the second attaching parts 30 and the end surfaces of the second attaching part 30 on the opposite side of the first attaching part 28 is equal to the distance A, or slightly smaller than the distance A. Thereafter, in the fourth Step S4 and the fifth Step S5, the drive unit 10 can be attached to the bracket 100.

The action and effects of the drive unit 10 will be described.

The adjustment members 34 that are attached to each of the first attaching parts 28 protrude from each of the first attaching parts 28 toward the first flange 104A in the crankshaft direction CA. Accordingly, the gaps G1 formed between the first attaching parts 28 and the first flange 104A are filled by the adjustment members 34, in a state in which the second attaching parts 30 are in contact with the second flange 104B. By adjusting the protrusion amounts of the adjustment members 34 from the first attaching part 28, the gap G1 between the first attaching part 28 and the first flange 104A can be appropriately filled by the adjustment member 34. Therefore, when the drive unit 10 is attached to the bracket 100, the fastening force by the bolt 32 can be increased, and the drive unit 10 can be suppressed from rattling relative to the bracket 100 in the crankshaft direction CA.

The drive unit 10 of the present embodiment exerts, for example, the following effects, in addition to the effect described above.

(1) The knurling 38A is formed on the outer peripheries of the adjustment members 34, and the knurling 28B is formed in the insertion bores 28A of the first attaching parts 28. According to this configuration, the adjustment members 34 are suppressed from rotating relative to the first attaching parts 28 around the central axes thereof. Accordingly, when the bolts 32 are screwed into the female threads 36A of the adjustment members 34, the adjustment members 34 are suppressed from rotating with the bolts 32. Accordingly, the work to screw the bolts 32 to the adjustment members 34 is facilitated.

(2) The adjustment members 34 are press-fitted to the insertion bores 28A of the first attaching parts 28. Accordingly, the adjustment members 34 are suppressed from moving relative to the first attaching parts 28 in the crankshaft direction CA.

(3) The adjustment members 34 comprise the bores 36 in which the bolts 32 can be inserted. The female thread 36A is formed in each of the bores 36 so that the adjustment members 34 can be coupled to the bolt 32. According to this configuration, it becomes possible to attach the drive unit 10 to the bracket 100, by the male threads 32B of the bolts 32 being coupled to the female threads 36A of the adjustment members 34.

(4) The drive unit 10 comprises the first attaching parts 28 and the second attaching parts 30 which can be respectively attached to the first and second flanges 104A and 104B of the bracket 100 by the bolts 32. Accordingly, compared to a configuration in which the drive unit 10 is attached to only one of the first and second flanges 104A and 104B, the drive unit 10 can be stably held to the bracket 100.

(5) Each of the adjustment members 34 includes the locking member 42. According to this configuration, loosening of the male threads 32B of the bolts 32 relative to the female threads 36A of the adjustment members 34 is suppressed, by the male threads 32B of the bolts 32 biting into the locking members 42.

Second Embodiment

Figure 10:
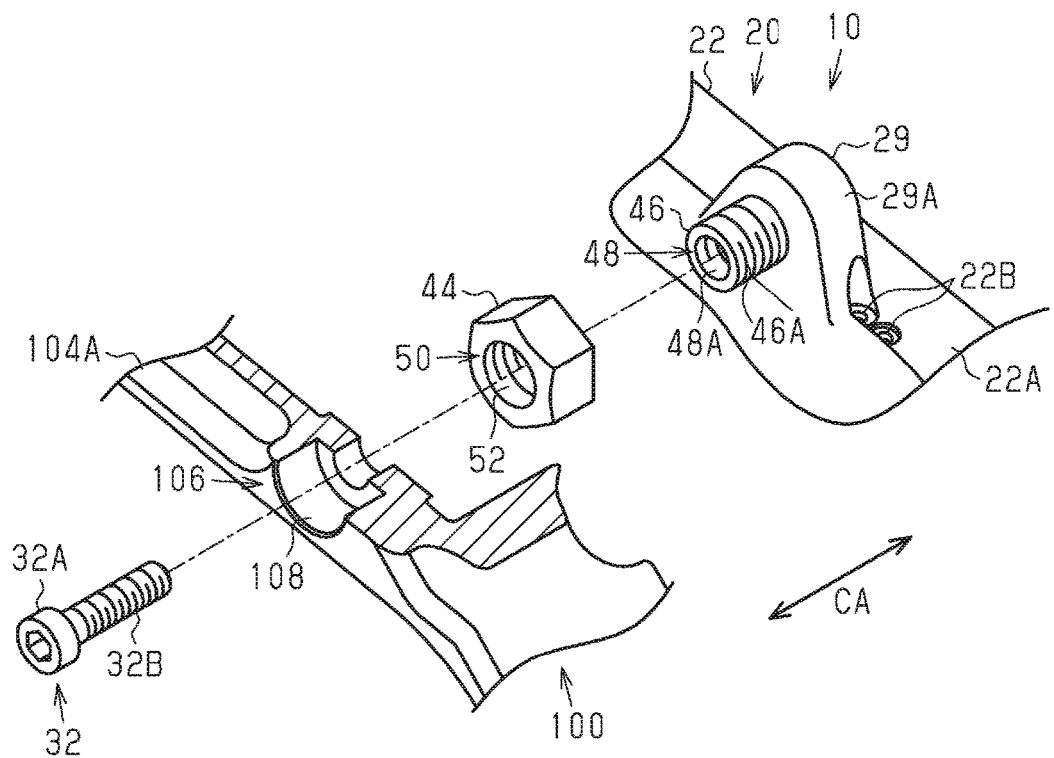
FIG. 10 is a perspective view of a portion of a bracket and a portion of a first attaching part of a drive unit in accordance with a second embodiment.
Figure 11:
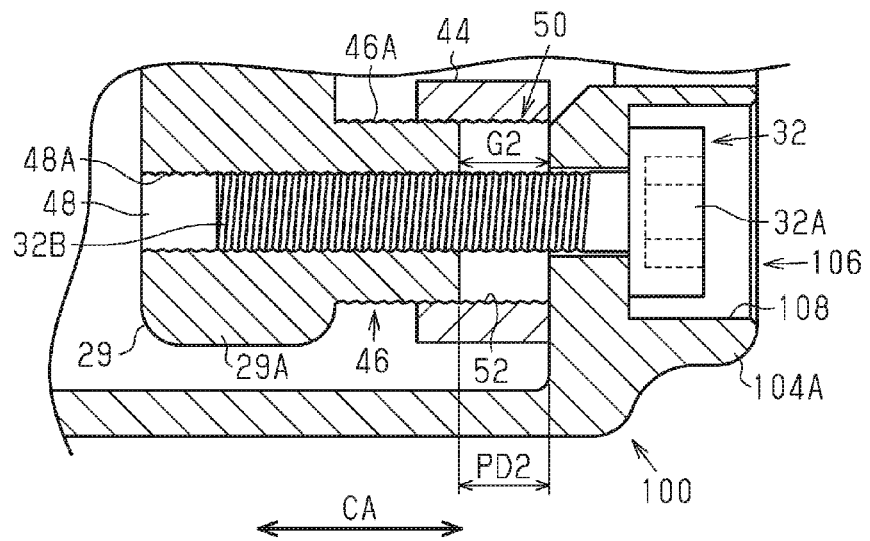
FIG. 11 is a partial cross sectional view of the bracket and the first attaching part illustrated in FIG. 10 having been coupled together.

Referring now to FIGS. 10 and 11, a configuration of the drive unit 10 (e.g., a bicycle component) and the attachment structure between the drive unit 10 and the bracket 100 will be described in accordance with a second embodiment. The drive units 10 of the first and second embodiments except for the following two differences. The first difference is the shape of the first attaching parts. The drive unit 10 is equipped with a plurality of first attaching parts 29 (only one shown) instead of the first attaching parts 28. The second difference is a plurality of adjustment members 44 (only one shown) are used instead of the adjustment members 34. The two differences from the drive unit 10 of the first embodiment will be described in detail below. For the sake of brevity, the configurations that are shared between the drive units 10 and the brackets 100 of the first and second embodiments will be given the same reference symbols, and the descriptions thereof will be omitted.

Referring to FIG. 10, each of the first attaching parts 29 is provided in the same position as the first attaching parts 28 (refer to FIG. 1) in the housing 20. For the sake of brevity, only one of the first attaching parts 29 will be shown and discussed. Each of the first attaching parts 29 comprises a supporting portion 46 having a male thread 46A on the outer peripheral thereof. The first attaching part 29 further comprises a main body portion 29A that protrudes outwardly from a side wall 22A of the housing main body 22. The main body portion 29A is formed in the same shape as the first attaching part 28. The supporting portion 46 is integrally formed with the main body portion 29A, and extends from the main body portion 29A toward the first flange 104A of the bracket 100. That is, the supporting portion 46 extends toward the opposite side of the second attaching part 30. The supporting portion 46 is formed separately from the first attaching part 29, and can be affixed to a hole (not shown) formed in the main body portion 29A, or, can be affixed to the main body portion 29A by welding, cementing, or bonding.

The first attaching part 29 comprises a bore 48 in which one of the bolts 32 can be inserted. The bore 48 extends through the main body portion 29A and the supporting portion 46 in the crankshaft direction CA. A female thread 48A that can be coupled to the bolt 32 is formed in the bore 48. The adjustment member 44 is coupled to the male thread 46A of the supporting portion 46. A bore 50 is formed in the adjustment member 44, which extends through in the crankshaft direction CA. A female thread 52 that is coupled to the male thread 46A is formed in the bore 50. In this embodiment, the adjustment member 44 includes a nut comprising the female thread 52.

As shown in FIG. 11, the adjustment member 44 is supported to the first attaching part 29 and configured to change the protrusion amount from the first attaching part 29, by changing the screwing amount of the adjustment member 44 with respect to the supporting portion 46. The adjustment member 44 shown in FIG. 11 protrudes from the side of the first flange 104A with respect to the supporting portion 46 so as to come in contact with the first flange 104A of the bracket 100.

Then, the bolt 32 is screwed into the bore 48 of the first attaching part 29 while in a state in which the adjustment member 44 is in contact with the first flange 104A. Accordingly, the male thread 32B of the bolt 32 and the female thread 48A of the bore 48 are coupled. In this manner, the first attaching part 29 can be attached to the bracket 100 by the bolt 32, which is inserted in the bore 48. The adjustment of a protrusion amount PD2 from the supporting portion 46 of the adjustment member 44 is the same as the attachment procedure of the drive unit 10 to the bracket 100 in the first embodiment. The adjustment member 44 is attached to the supporting portion 46 so as to match the gap G2 between the first attaching part 29 and the first flange 104A.

The drive unit 10 of the present embodiment exerts, for example, the following effects, in addition to an effect corresponding to effect (4) of the first embodiment.

(6) The adjustment members 44 are attached to the supporting portion 46 of each of the first attaching parts 29 such that the adjustment members 44 protrudes from each of the supporting portions 46 toward the first flange 104A in the crankshaft direction CA. Accordingly, a gap G2 is formed between each of the first attaching parts 29 and the first flange 104A, which is filled by the adjustment member 44 while in a state in which the second attaching parts 30 are in contact with the second flange 104B. Therefore, when the drive unit 10 is attached to the bracket 100, the fastening force by the bolts 32 can be increased, and the drive unit 10 can be suppressed from rattling relative to the bracket 100 in the crankshaft direction CA.

(7) The adjustment members 44 are screwed to the supporting portions 46 so that the female threads 52 of the adjustment members 44 are coupled to the male threads 46A of the supporting portions 46 of the first attaching parts 29. According to this configuration, the protrusion amounts of the adjustment members 44 from the first attaching parts 29 can be easily adjusted by the screwing amounts of the adjustment members 44 being changed.

(8) Since the female thread 48A is formed in the bore 48 of the first attaching part 29 is coupled to the male thread 32B of the bolt 32, and it is not necessary to separately provide a nut for attachment, it is easy to attach the first attaching part 29 to the first flange 104A.

Third Embodiment

Referring now to FIGS. 12 to 16, a configuration of the drive unit 10 (e.g., a bicycle component) and the attachment structure between the drive unit 10 and the bracket 100 will be described in accordance with a third embodiment. The drive units 10 of the first and third embodiments except for the following two differences. The first difference is the drive unit 10 is equipped with a plurality of first attaching parts 31 instead of the first attaching parts 28. The second difference is a plurality of adjustment members 54 are used instead of the adjustment members 34. In the third embodiment, a tapered washer is used as a washer. The two differences from the drive unit 10 of the first embodiment will be described in detail below. For the sake of brevity, the configurations that are shared between the drive units 10 and the brackets 100 of the first and third embodiments will be given the same reference symbols, and the descriptions thereof will be omitted.

Figure 12:
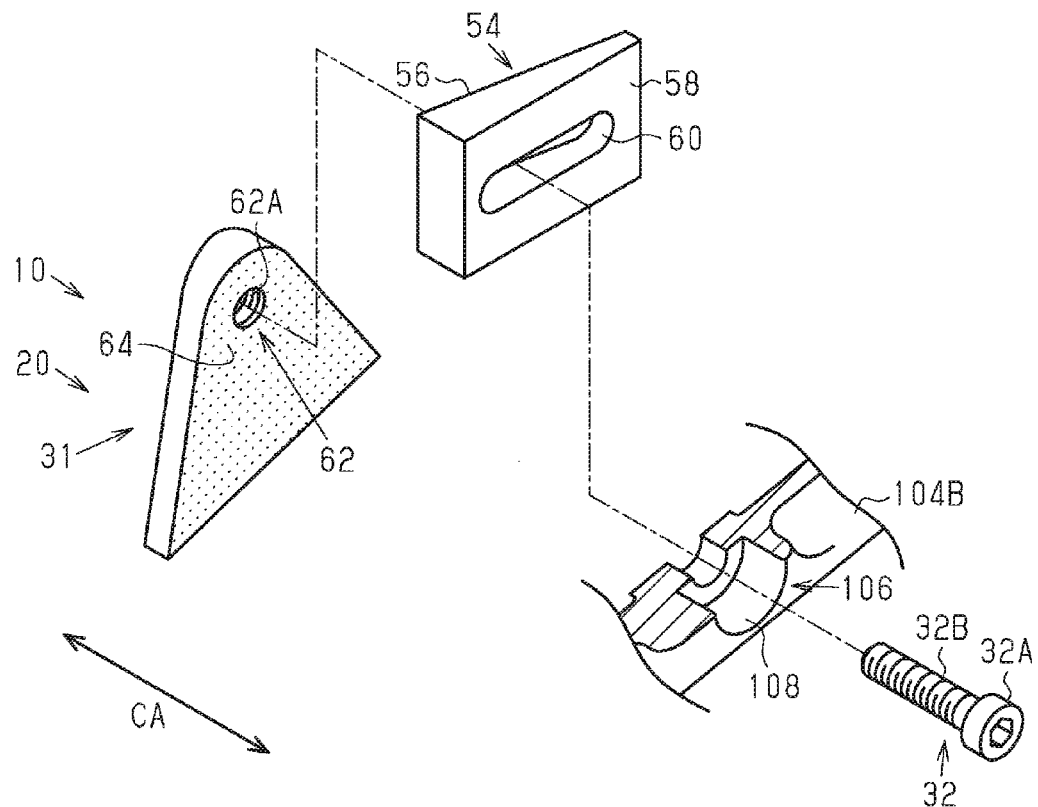
FIG. 12 is an exploded perspective view of a portion of a bracket and a portion of a first attaching part of a drive unit in accordance with a third embodiment.

Referring to FIG. 12, each of the first attaching parts 31 is provided in the same position as the first attaching part 28 (refer to FIG. 1) in the housing 20. For the sake of brevity, only one of the first attaching parts 31 will be shown and discussed. The adjustment member 54 is interposed between the first attaching part 31 and the first flange 104A in the crankshaft direction CA. The adjustment member 54 can be, for example, made of metal, made of resin, or be formed of an elastic member such as rubber.

The adjustment member 54 comprises a first inclined surface 56 that contacts the first attaching part 31. The adjustment member 54 is formed into a thin plate, and further comprises the first plane 58 that is positioned on the opposite side of the first inclined surface 56 in the thickness direction. The first inclined surface 56 is inclined relative to a first plane 58. The adjustment member 54 comprises a tapered shape. The thickness direction of the adjustment member 54 is parallel to the crankshaft direction CA in a state of being attached between the drive unit 10 and the housing 20.

The one of the bolts 32 can be inserted in the adjustment member 54. In particular, the adjustment member 54 comprises an elongated hole 60 that extends in a tapering direction. The elongated hole 60 extends through the first inclined surface 56 and the first plane 58 in the thickness direction. In the present embodiment, the dimensions of the adjustment member 54 are formed so that the direction in which the elongated hole 60 extends will be the longitudinal direction.

Figure 13:
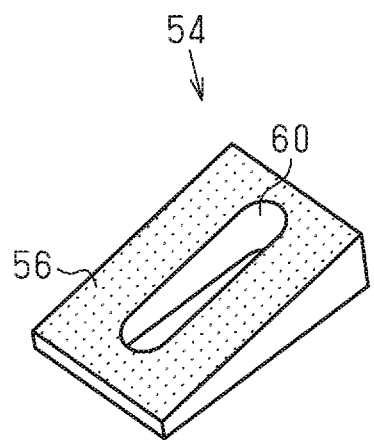
FIG. 13 is a perspective view of the adjustment member illustrated in FIG. 12.

As shown by the hatching in FIG. 13, preferably, the first inclined surface 56 is textured to increases the friction resistance between the first attaching part 31 (refer to FIG. 12) and the first inclined surface 56. For example, a shot blast process can be applied to the first inclined surface 56 as one process that can be used to increase the friction resistance of the first inclined surface 56. Meanwhile, the texturing process that increases the friction resistance is preferably applied across substantially the entire first inclined surface 56, but process that increases the friction resistance can be applied only to a portion of the first inclined surface 56.

As shown in FIG. 12, the first attaching part 31 comprises a bore 62 in which the one of the bolts 32 can be inserted, and can be attached to the bracket 100 by the bolt 32 that is inserted in the bore 62. The bore 62 extends through the first attaching part 31 in the crankshaft direction CA. A female thread 62A that can be coupled to the bolt 32 is formed in the bore 62 of the first attaching part 31.

As shown by the hatching in FIG. 12, the first attaching part 31 comprises a second inclined surface 64 that comes in surface contact with the first inclined surface 56 of the adjustment member 54. The second inclined surface 64 is inclined relative to a surface that is perpendicular to the crankshaft direction CA. The second inclined surface 64 is preferably inclined with respect to around a prescribed axis that extends in a direction from the proximal end to the distal end of the first attaching part 31. It is preferable for the process that increases the friction resistance between the first inclined surface 56 of the adjustment member 54 to be applied to the second inclined surface 64. As a process that increases this friction resistance, for example, a shot blast step is applied to the second inclined surface 64. Meanwhile, a process that increases the friction resistance is not limited to being applied across the entire surface of the second inclined surface 64, and can be applied only to a portion of the second inclined surface 64.

Figure 14:
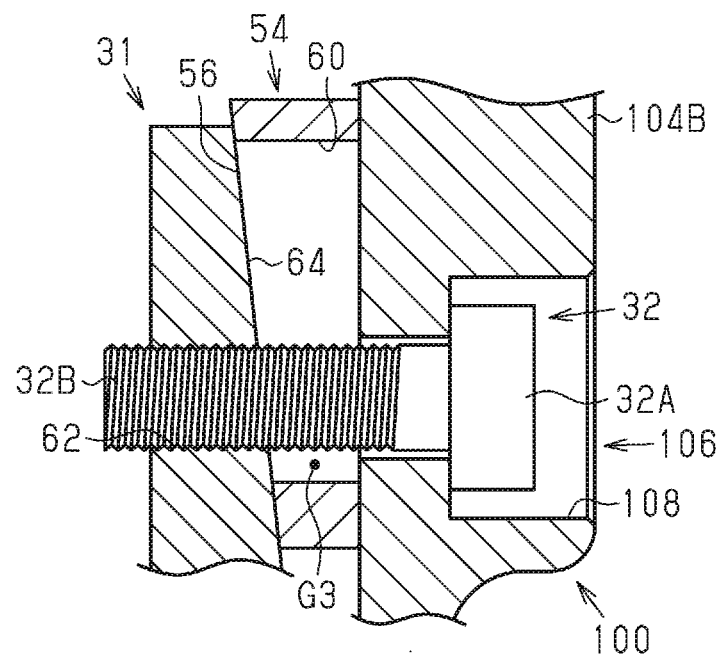
FIG. 14 is a cross-sectional view of a bracket and a first attaching part illustrated in FIG. 12 having been coupled together.

As shown in FIG. 14, the adjustment member 54 is disposed between the first attaching part 31 and the first flange 104A so that the first inclined surface 56 opposes the second inclined surface 64 of the first attaching part 31, and so that the tapering direction of the first inclined surface 56 and the tapering direction of the second inclined surface 64 of the first attaching part 31 are parallel to each other. The first inclined surface 56 and the second inclined surface 64 are in surface contact with each other. The bolt 32 is screwed to the bore 62 of the first attaching part 31, in a state in which the adjustment member 54 is sandwiched between the first attaching part 31 and the first flange 104A. The bolt 32 that is screwed to the bore 62 of the first attaching part 31 is inserted in the through-hole 106 of the first flange 104A and the elongated hole 60 of the adjustment member 54. The inclination angle of the second inclined surface 64 with respect to the axis of a crankshaft is preferably selected to as to be equal to the inclination angle of the first inclined surface 56 with respect to the first plane 58.

Figure 15:
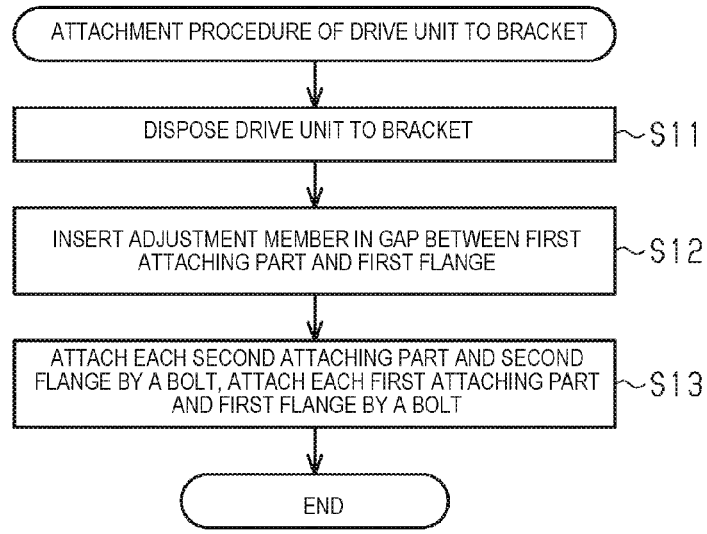
FIG. 15 is a flowchart showing the attachment procedure of a drive unit.
Figure 16:
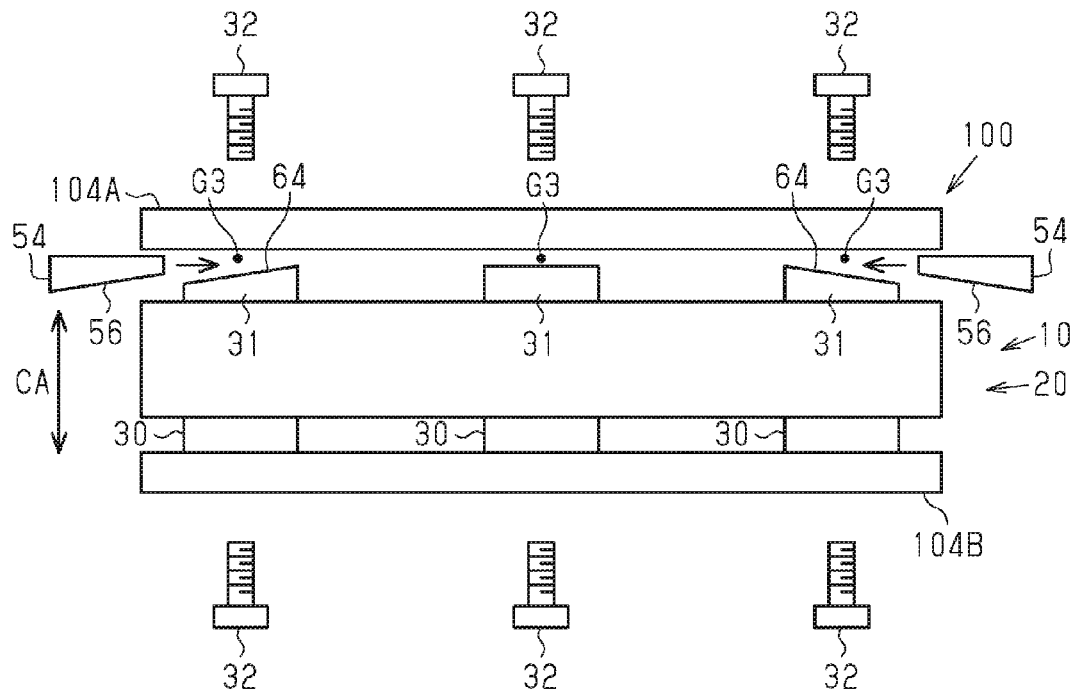
FIG. 16 is a schematic view regarding Steps S11 and S13 in FIG. 15.

As shown in FIG. 15, the attachment procedure of the drive unit 10 to the bracket 100 comprises a first Step S11, a second Step S12 and a third Step S13. As shown in FIG. 16, in the first Step S1, the drive unit 10 is disposed in the bracket 100. Specifically, the drive unit 10 is disposed in a state of being placed closer to one side of the bracket 100 in the crankshaft direction CA, so that the second attaching parts 30 contact the second flange 104B. At this time, gaps G3 are formed between the first attaching parts 31 and the first flange 104A in the crankshaft direction CA.

Then, in the second Step S12, the adjustment members 54 are inserted into each of the gaps G3 between the first attaching parts 31 and the first flange 104A, which are the two ends of a frame in the longitudinal direction, in the circumferential direction around the housing 20 in the crankshaft direction CA. Meanwhile, it is sufficient that the adjustment members 54 are inserted in each of the gaps G3 between two of the three first attaching parts 31 and the first flange 104A, and the selection of the two of the first attaching parts 31 into which the adjustment members 34, 44, 54, 74, 75 and 84 are inserted is a matter that can be freely set. Of course, the adjustment members 54 can be inserted between the first flange 104A and each of the first attaching parts 31. In the third Step S13, the first attaching parts 31 and the first flange 104A are affixed by three of the bolts 32, and the second attaching parts 30 and the second flange 104B are affixed by another three of the bolts 32. The second Step S12 and the third Step S13 can be combined into one step if needed and/or desired. For example, the first attaching parts 31 and the first flange 104A can be affixed by the bolts 32 each time the adjustment members 54 are inserted between the first attaching parts 31 and the first flange 104A.

The drive unit 10 of the present embodiment exerts, for example, the following effects, in addition to an effect corresponding to effect (4) of the first embodiment and an effect corresponding to effect (8) of the second embodiment.

(9) The drive unit 10 is equipped with the adjustment members 54 that are disposed in the gap G3 that is formed between the first attaching parts 31 and the first flange 104A. Since the adjustment members 54 come in contact with both the first attaching parts 31 and the first flange 104A, when the drive unit 10 is attached to the bracket 100, the fastening force by the bolts 32 can be increased, and the drive unit 10 can be suppressed from rattling relative to the bracket 100 in the crankshaft direction CA.

(10) Since the insertion amounts of the adjustment members 54 can be changed in accordance with the sizes of the gaps G3 between the first attaching parts 31 and the first flange 104A, the adjustments to fill the gaps G3 can be easily carried out.

(11) A shot blast process is applied to the first inclined surfaces 56 of the adjustment members 54, as a process for increasing friction resistance. Accordingly, the friction resistance between the first inclined surfaces 56, and the second inclined surfaces 64 of the first attaching parts 31 which comes in surface contact therewith, is increased. Therefore, the adjustment members 54 is less likely to move relative to the first attaching parts 31 when fastening the bolts 32, as well as after fastening the bolts 32.

(12) A shot blast process is applied to the second inclined surfaces 64 of the first attaching parts 31, as a process for increasing friction resistance. Accordingly, the friction resistance between the second inclined surfaces 64 and the first inclined surfaces 56 of the adjustment members 54 is further increased. Therefore, the adjustment members 54 are even less likely to move relative to the first attaching parts 31 when fastening the bolts 32, as well as after fastening the bolts 32.

Fourth Embodiment

Referring now to FIGS. 17 to 21 a configuration of the drive unit 10 (e.g., a bicycle component) and the attachment structure between the drive unit 10 and the bracket 100 will be described in accordance with a fourth embodiment. The drive units 10 of the first and fourth embodiments except for the following two differences. The first difference is a plurality of adjustment members 84 are used instead of the adjustment members 34. The second difference is the drive unit 10 is equipped with a plurality of first attaching parts 33 instead of the first attaching parts 28. In the fourth embodiment, a tapered washer is used as a washer. The two differences from the drive unit 10 of the first embodiment will be described in detail below. For the sake of brevity, the configurations that are shared between the drive units 10 and the brackets 100 of the first and fourth embodiments will be given the same reference symbols, and the descriptions thereof will be omitted.

Figure 17:
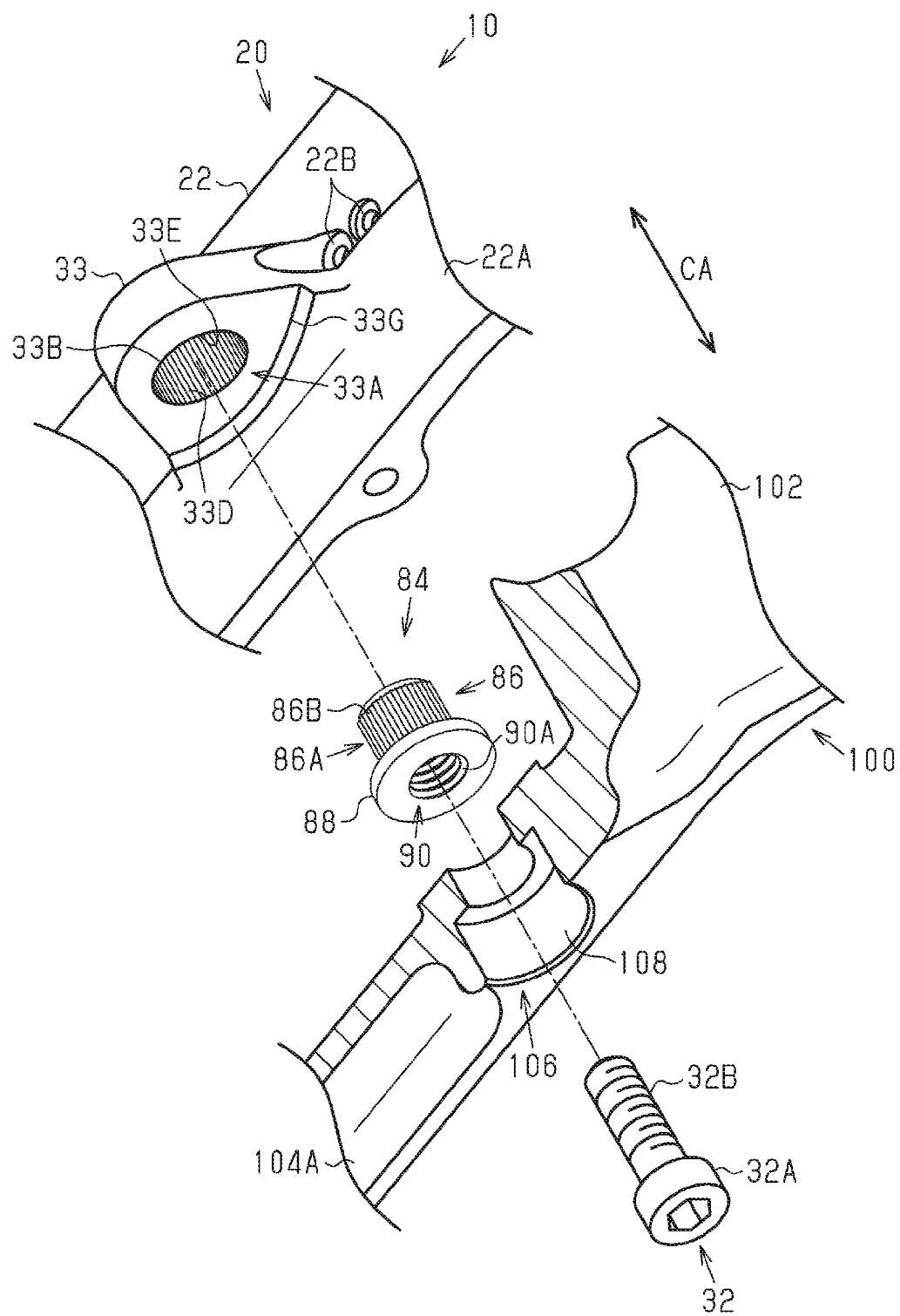
FIG. 17 is an exploded perspective view of a bracket and a first attaching part in accordance with a fourth embodiment.

Referring to FIG. 17, each of the first attaching parts 33 is provided in the same position as the first attaching parts 28 (refer to FIG. 1) in the housing 20. For the sake of brevity, only one of the first attaching parts 3 will be shown and discussed. Each of the adjustment members 84 comprises a holding portion 86 and a flange portion 88. The holding portion 86 is held to one of the first attaching parts 33. The flange portion 88 is provided to the end of the holding portion 86. The holding portion 86 and the flange portion 88 are preferably formed integrally, but a separately formed holding portion 86 and flange portion 88 can be configured to be coupled with each other. The adjustment member 84 can be made of metal, or made of synthetic resin.

The holding portion 86 comprises the bore 90 in which one of the bolts 32 can be inserted. The bore 90 has a female thread 90A that can be coupled to the bolt 32. The shape of the holding portion 86 is preferably cylindrical shape, but the shape of the cross section perpendicular to the axial direction can be polygonal as long as the shape is tubular. A suppression portion 86A that suppresses the movement of the adjustment member 84 relative to the first attaching part 33 is provided to the outer periphery of the holding portion 86. The suppression portion 86A includes knurling 86B that is formed on the outer periphery of the adjustment member 84. The knurling 86B extends in the crankshaft direction CA.

The outer shape of the flange portion 88 is preferably circular, but can be polygonal, as viewed from the axial direction. Further, the flange portion 88 is preferably formed across the entire circumference of the holding portion 86, but bay be formed only in a portion of the holding portion 86 in the circumferential direction.

Figure 18:
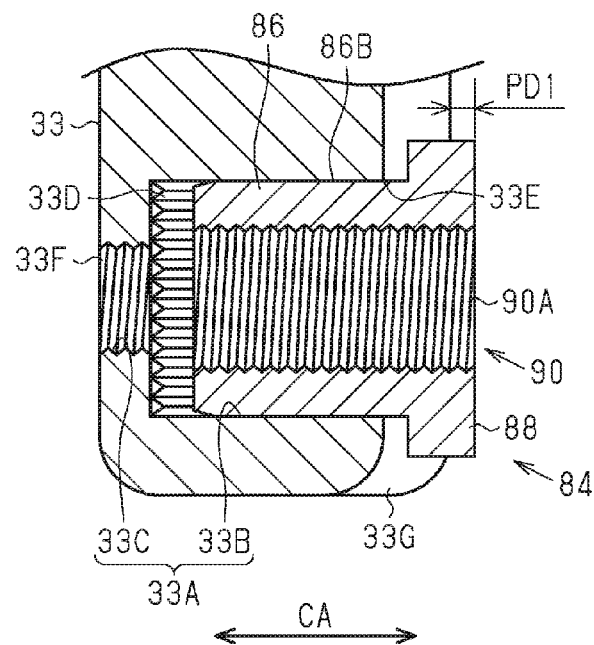
FIG. 18 is a partial cross sectional view of the adjustment member and the first attaching part having been coupled.

As shown in FIGS. 17 and 18, the first attaching part 33 comprises an insertion bore 33A in which the holding portion 86 of the adjustment member 84 is press-fitted. The insertion bore 33A comprises the first portion 33B in which the adjustment member 84 is press-fitted, and the second portion 33C having a smaller inner diameter than the inner diameter of the first portion 33B.

The first portion 33B preferably has knurling 33D which extends in the crankshaft direction CA. When the adjustment member 84 is press-fitted to the first portion 33B, the rotation of the adjustment member 84 around the axis can be suppressed, by the knurling 33D of the first portion 33B and the knurling 86B of the holding portion 86 being engaged.

The second portion 33C is linked with a portion of the first portion 33B on the opposite side of an opening 33E in which the adjustment member 84 is inserted. A female thread 33F is provided to the second portion 33C. The inner diameter of the second portion 33C is smaller than the inner diameter of the bore 90 of the adjustment member 84. The female thread 33F is provided within the bore of the first portion 33B, when viewed from the axial direction of the bolt 32 (refer to FIG. 19). Preferably, the female thread 33F is provided within the bore 90 of the adjustment member 84, when viewed from the axial direction of the bolt 32.

The first attaching part 33 further comprises a recess 33G that houses the flange portion 88 of the adjustment member 84. The recess 33G is formed around the opening 33E of the insertion bore 33A. The depth dimension of the recess 33G is preferably equal to the thickness dimension of the flange portion 88, or greater than the thickness dimension of the flange portion 88. However, the depth dimension of the recess 33G is a matter that can be freely set.

Figure 19:
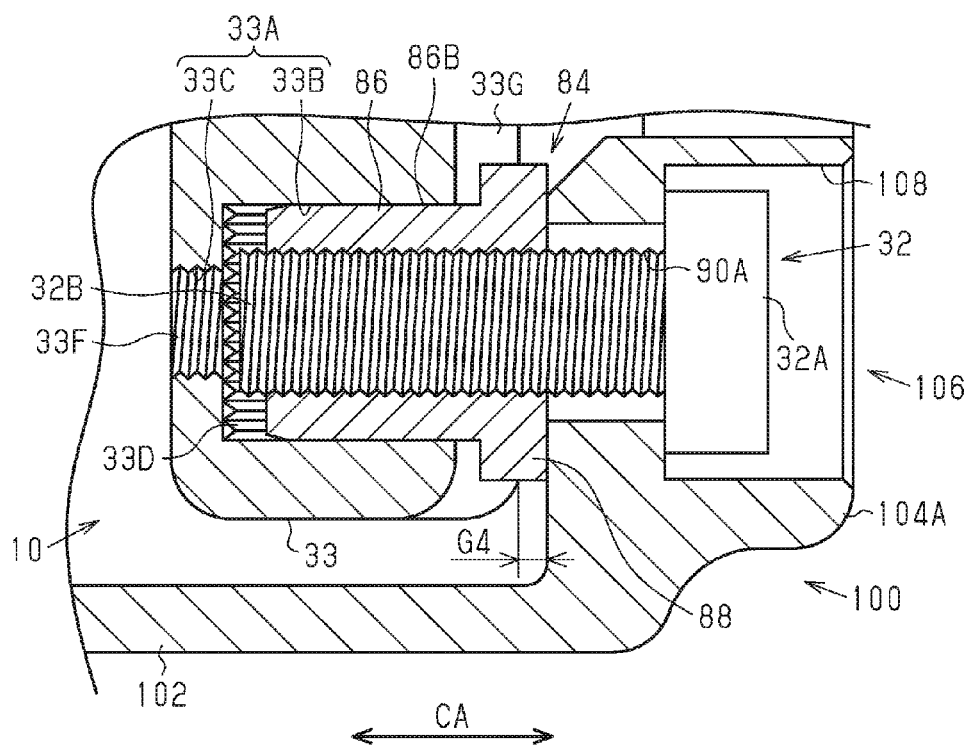
FIG. 19 is a partial cross sectional view of the bracket and the first attaching part having been coupled together.

FIG. 19 shows a state in which the drive unit 10 is attached to the bracket 100 by the bolts 32, which are inserted in the bores 90 of the adjustment members 84.

The flange portion 88 of the adjustment member 84 protrudes from the first attaching part 33 in the crankshaft direction CA, so that the end surface thereof in the crankshaft direction CA comes in contact with the first flange 104A of the bracket 100. That is, the flange portion 88 is disposed in a gap G4 that is formed between the first attaching part 33 and the bracket 100 (frame).

By screwing the bolt 32 to the adjustment member 84, the end surface of the flange portion 88 of the adjustment member 84 in the crankshaft direction CA is put in a state of contacting the first flange 104A of the bracket 100. At this time, a male thread 32B of the bolt 32 is screwed to the female thread 90A of the adjustment member 84.

The attachment procedure of the drive unit 10 to the bracket 100 will be described with reference to FIGS. 20 and 21. The compositional elements of the drive unit 10 and the bracket 100 described with reference to FIG. 20 indicate the compositional elements of the drive unit 10 and the bracket 100 in FIGS. 17 to 19.

The attachment procedure of the drive unit 10 to the bracket 100 of the present embodiment omits the process of Step S1-S3 with respect to the attachment procedure of the drive unit 10 to the bracket 100 of the first embodiment, to clarify the attachment order of the bolts 32 to the first attaching parts 33 and the second attaching parts 30. The adjustment members 84 are press-fitted to the first attaching parts 33 in advance, and are in a state in which the flange portions 88 are in contact with the first attaching parts 33.

Figure 20:
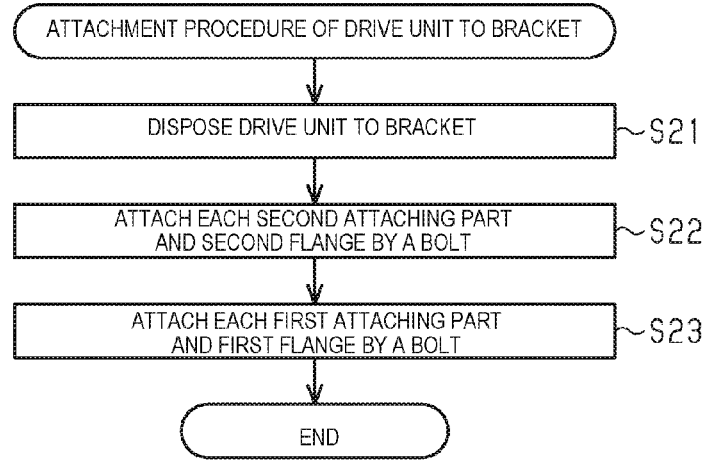
FIG. 20 is a flowchart showing the attachment procedure of the drive unit.
Figure 21:
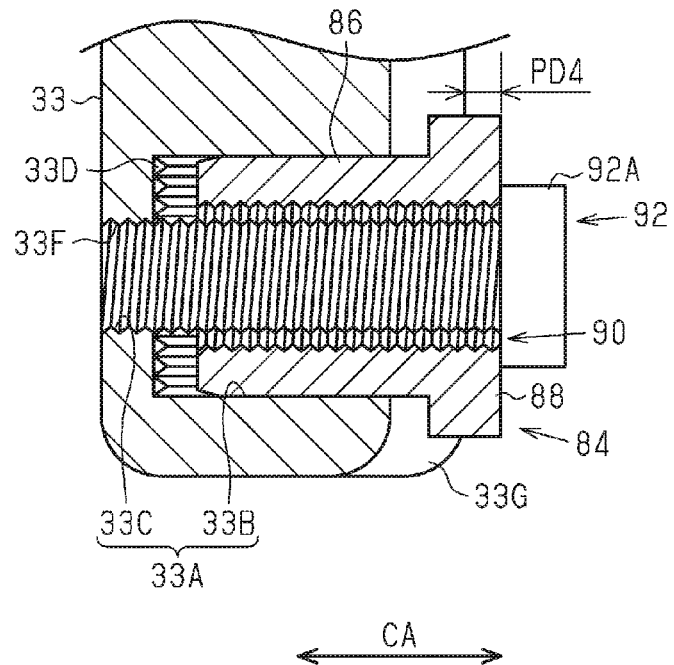
FIG. 21 is a partial cross sectional view of the first attaching part and the adjustment member, related to the adjustment of a protrusion amount of the adjustment member from the first attaching part.

As shown in FIG. 20, after disposing the drive unit 10 in the bracket 100 in the first Step S21, each of the second attaching parts 30 and the second flange 104B (both refer to FIG. 1) is attached by one of the bolts 32 in the second Step S22. Then, each of the first attaching parts 33 and the first flange 104A are attached by the bolts 32 in the third Step S23. When there are gaps between the first attaching parts 33 and the first flange 104A, the adjustment members 84 are drawn from the first attaching parts 33, and the adjustment members 84 comes in close contact with the first flange 104A, in the third Step S23.

In the case that the drive unit 10 which is attached to a bicycle (not shown) is to be re-mounted on another bicycle (not shown), there are cases in which the protrusion amounts PD4 of the adjustment members 84 from the first attaching parts 33 are great, and thus cannot be inserted in the bracket 100 of the other bicycle. In such a case, as shown in FIG. 21, the protrusion amounts PD4 of the adjustment members 84 are reduced by using the adjustment bolts 92 having a smaller outer diameter than the inner diameter of the bores 90 of the adjustment members 84. Specifically, the adjustment bolts 92 are inserted in the bores 90 of the adjustment members 84, and coupled to the female threads 33F of the second portions 33C. Then, the bolt heads 92A of the adjustment bolts 92 come in contact with the flange portions 88 of the adjustment members 84 by the adjustment bolts 92 being screwed to the second portions 33C, and the adjustment members 84 are pushed in so as to reduce the protrusion amounts PD4 of the adjustment members 84.

The drive unit 10 of the present embodiment exerts, for example, the following effects, in addition to effects (1) to (4) of the first embodiment.

(13) Since the flange portions 88 of the adjustment members 84 come in contact with the first flange 104A of the bracket 100, the contact area between the adjustment members 84 and the first flange 104A can be increased, compared to adjustment members in which the flange portions 88 are omitted. Accordingly, the surface pressure applied to the bracket 100 can be suppressed.

(14) The protrusion amounts PD4 of the adjustment members 84 from the first attaching parts 33 can be adjusted in a range that is smaller than the thickness dimension of the flange portions 88, by the recesses 33G, which can house the flange portions 88, being provided to the first attaching parts 33.

(15) The protrusion amounts PD4 of the adjustment members 84 from the first attaching parts 33 can be reduced, by the adjustment bolts 92 being inserted in the bores 90 of the adjustment members 84 and then being screwed to the female threads 33F of the second portions 33C of the first attaching parts 33.

(16) It is possible to suppress moment being generated in the adjustment members 84, by the first attaching parts 33 and the first flange 104A being affixed by the bolts 32, after the second attaching parts 30 and the second flange 104B are affixed by the bolts 32. Accordingly, the adjustment members 84 are suppressed from being pressed against the insertion bores 33A in the radial direction of the insertion bores 33A.

MODIFIED EXAMPLES

The descriptions relating to each embodiment described above are examples of forms that a bicycle component according to the present invention can take, and are not intended to limit the forms thereof. A bicycle component according to the present invention can take the forms of the modified examples of the embodiment shown below, as well as forms that combine at least two modified examples that are not mutually contradictory.

Figure 22:
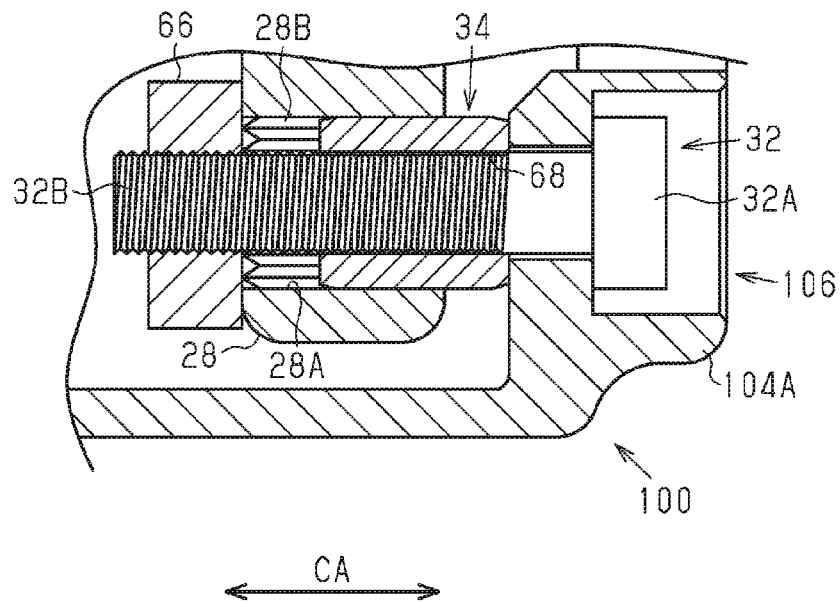
FIG. 22 is a partial cross sectional view of a bracket and a first attaching part in accordance with a first modified example.

In the above-described first embodiment, as shown in FIG. 22, the first attaching part 28 of the drive unit 10 can be attached to the first flange 104A of the bracket 100 by the bolt 32 and a nut 66. In this case, a through-hole 68 is formed in the adjustment member 34 in which the female thread 36A is omitted. The nut 66 is disposed to the first attaching part 28 on the opposite side of the first flange 104A in the crankshaft direction CA, and comes in contact with the first attaching part 28. Meanwhile, the above-described second embodiment to the above-described fourth embodiment can also be changed to the attachment structure of the first attaching part 28 to the bracket 100 by the bolt 32 and the nut 66.

Figure 23:
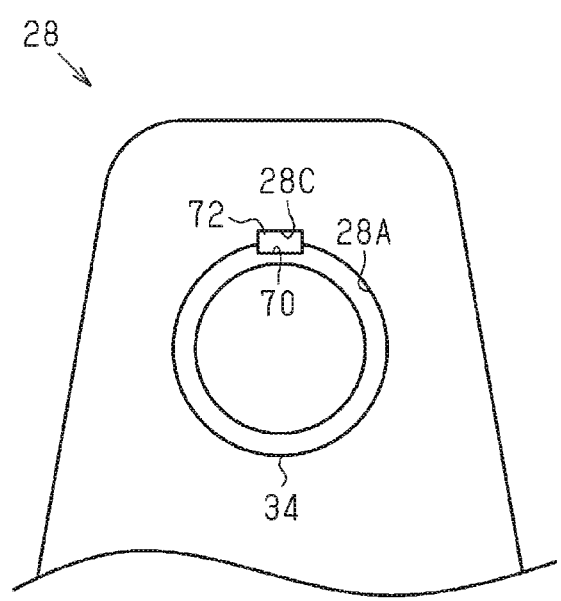
FIG. 23 is a partial cross sectional view of a first attaching part in accordance with a second modified example.

In the above-described first embodiment, the mechanism for suppressing the adjustment member 34 from rotating relative to the first attaching part 28 (hereinafter referred to as "rotation suppression mechanism") can be formed of a key groove and a key member that is fitted to a key groove. For example, as shown in FIG. 23, the rotation suppression mechanism is formed of a recess 28C that is formed in the insertion bore 28A of the first attaching part 28, a recess 70 that is formed on the outer periphery of the adjustment member 34 which opposes a recess 28C in a planar direction that is perpendicular to the crankshaft direction CA, and the key member 72 that is fitted in a space that is formed by the recesses 28C and 70. In this case, the knurling 38A of the adjustment member 34 and the knurling 28B of the first attaching part 28 (both refer to FIG. 3) can be omitted. Meanwhile, the recess 70 is preferably formed in a position that is different from the slit 40 of the adjustment member 34 (refer to FIG. 3) in the circumferential direction of the adjustment member 34. Meanwhile, the recess 70 and the key member 72 comprise a suppression unit that suppresses the movement of the adjustment member 34 with respect to the first attaching part 28. Meanwhile, the above-described fourth embodiment can also be changed to a configuration comprising a space that is formed by the recesses 28C and 70 and the key member 72 that is fitted in the space.

In the first embodiment and each of the modified examples of the first embodiment described above, the dimension of the locking member 42 in the circumferential direction of the adjustment member 34 and the dimension of the locking member 42 in the axial direction of the adjustment member 34 (crankshaft direction CA) are matters that can be freely set.

In the first embodiment and each of the modified examples of the first embodiment described above, it is not necessary for a bore of the adjustment member 34 to extend through the adjustment member 34 in the crankshaft direction CA.

In the first embodiment and each of the modified examples of the first embodiment described above, the locking member 42 can be omitted from the adjustment member 34. In this case, the slit 40 is omitted from the adjustment member 34.

In the first embodiment and each of the modified examples of the first embodiment described above, the knurling 28B can be omitted from the insertion bore 28A of the first attaching part 28.

In the fourth embodiment described above, the knurling 33D can be omitted from the first portion 33B, the knurling 86B on the outer periphery of the adjustment member 84 can be omitted, or both the knurling 33D and the knurling 86B can be omitted.

Figure 24:
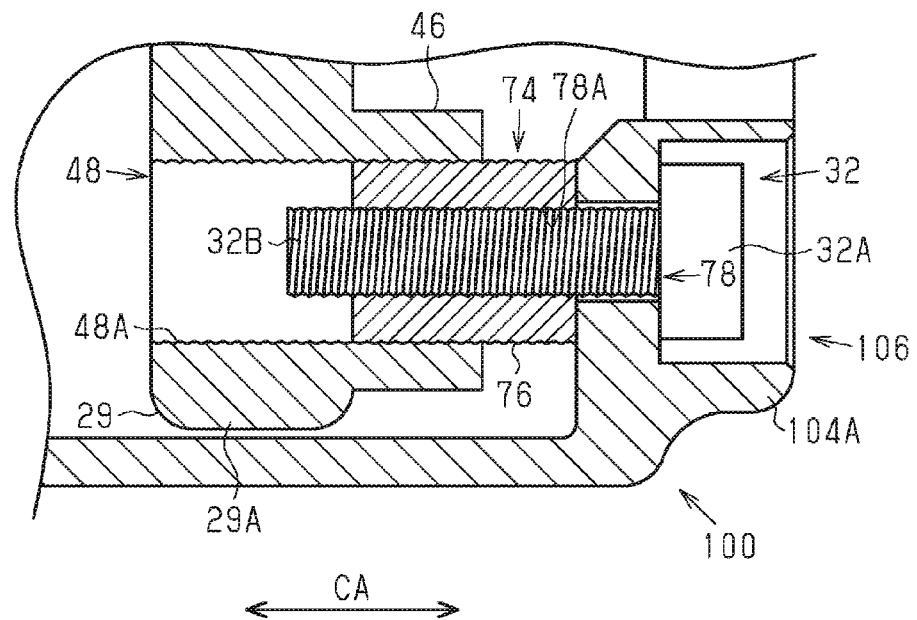
FIG. 24 is a partial cross sectional view of a bracket and a first attaching part in accordance with a third modified example.

The second embodiment described above can be a configuration in which the adjustment member is screwed to the inner side of the supporting portion 46 of the first attaching part 29. For example, as shown in FIG. 24, the bore 48 including the supporting portion 46 of the first attaching part 29 is radially enlarged, after which the adjustment member 74 is screwed to the female thread 48A of the first attaching part 29. The shape of the adjustment member 74 is, for example, a cylindrical shape. A male thread 76 is formed on the outer periphery of the adjustment member 74. The male thread 76 is coupled to the female thread 48A. The inner periphery of the adjustment member 74 has a bore 78 in which the one of the bolts 32 can be inserted. The female threads 78A that can be coupled to the bolts 32 are formed in the bores 78. The bolts 32 are screwed into the bores 78 of the adjustment members 74. The male thread that is formed on the outer periphery of the first attaching part 29 is omitted.

In the modified example shown in FIG. 24, the supporting portion 46 can be omitted.

In the above-described second embodiment and the modified example shown in FIG. 24, the supporting portion 46 and the main body portion 29A of the first attaching parts 29 can be separately formed. In this case, for example, the male thread 46A of the supporting portion 46 is coupled to the female thread 48A of the bore 48 of the main body portion 29A. Then, the bolts 32 are coupled to a female thread (not shown) formed in bores of the supporting portions 46. The first attaching parts 29 are thereby attached to the first flange 104A.

In the third embodiment described above, as shown in FIG. 25, the washer 80 which does not comprise the first inclined surface 56 can be disposed in a gap G3 between the first attaching part 31 and the first flange 104A, instead of the adjustment member 54. The washer 80 is, for example, made of metal or made of resin.

In the third embodiment described above, the second inclined surface 64 can be omitted from the first attaching part 31. In the case that the second inclined surface 64 is omitted from the first attaching part 31, it is more preferable to use a typical washer than using a tapered washer, as the adjustment member 44. A typical washer is a washer in which the two end surfaces in the axial direction of a hole are parallel to each other. In this case, a plurality of washers 80 can be stacked and disposed between the first attaching part 31 and the bracket 100. The thicknesses of the plurality of washers can be different from each other.

Figure 25:
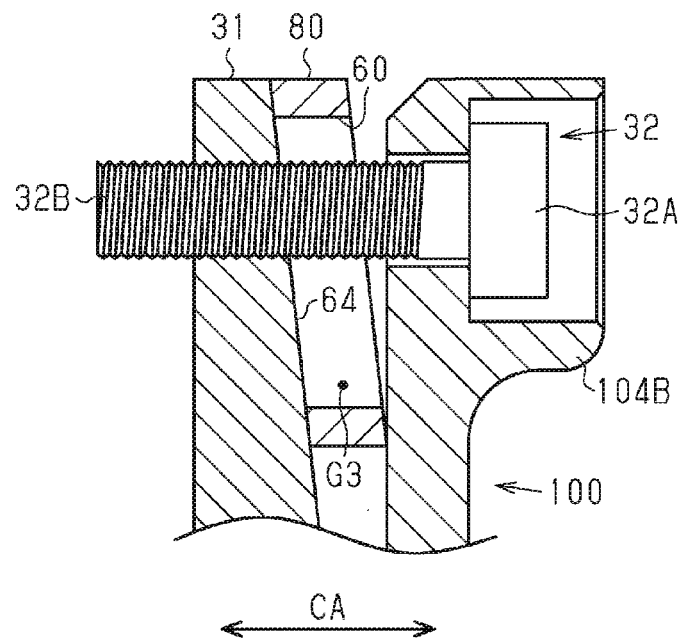
FIG. 25 is a partial cross sectional view of a bracket and a first attaching part in accordance with a fourth modified example.

In the above-described third embodiment and the modified example shown in FIG. 25, the adjustment member 54 can comprise a plurality of tapered washers, or a tapered washer and a typical washer. Meanwhile, there can be a plurality of tapered washers and typical washers.

An elastic member such as rubber can be adhered to at least one of the first inclined surface 56 of the adjustment member 54 and the second inclined surface 64 of the first attaching part 31 in the above-described third embodiment as a step for increasing friction resistance.

In the third embodiment described above, a process for increasing friction resistance can be omitted from at least one of the second inclined surface 64 of the first attaching part 31 and the first inclined surface 56 of the adjustment member 54.

In the above-described third embodiment and the modified example shown in FIG. 25, the shapes of the adjustment member 54 and a washer 80 when viewed from the crankshaft direction CA, are matters that can be freely set. For example, the shapes of the adjustment member 54 and the washer 80 when viewed from the crankshaft direction CA is an elliptical shape.

In the second and third embodiments described above, as well as in each modified example of the second and third embodiments described above, it is not necessary for the bores 48 and 62 of the first attaching parts 29 and 31, to extend through the first attaching parts 29 and 31 in the crankshaft direction CA.

In each of the embodiments and each of the modified examples described above, the drive unit 10 can be configured so that the adjustment members 34, 44, 54, 74 and 84 and the washer 80 are provided to at least one of a plurality of the first attaching parts 28, 29, 31 and 33.

In each of the embodiments and each of the modified examples described above, the first attaching parts 28, 29, 31 and 33 can be formed separately from the housing main body 22 of the drive unit 10, and affixed to the housing main body 22 by welding, cementing, or bonding.

Figure 26:
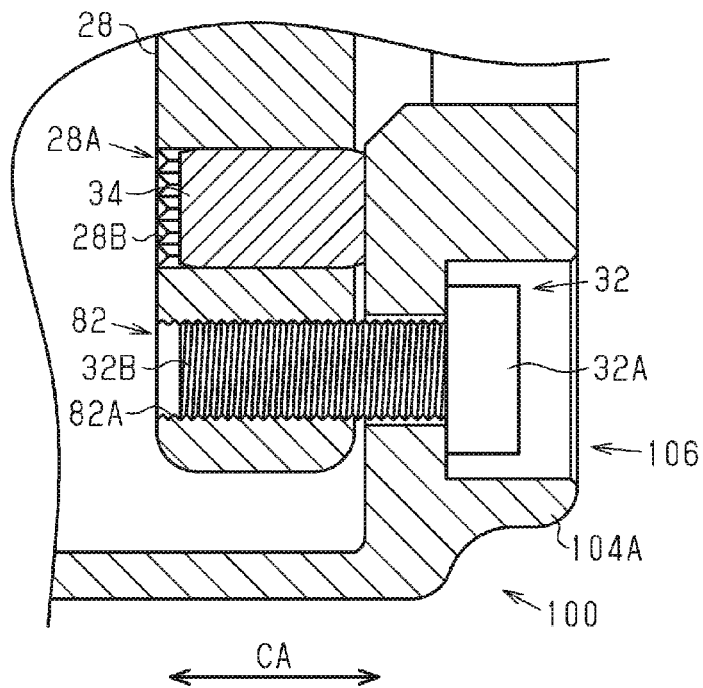
FIG. 26 is a partial cross sectional view of a bracket and a first attaching part in accordance with a fifth modified example.

In each of the embodiments and each of the modified examples described above, an adjustment member (the adjustment members 34, 44, 54, etc.) can be disposed in a position that is different from a bore (the insertion bore 28A, the bore 48, the bore 62, and the insertion bore 33A) of the first attaching parts 28, 29, 31 and 33 in which the one of the bolts 32 can be inserted. For example, as shown in FIG. 26, a bore 82 in which the one of the bolts 32 can be inserted is formed in the first attaching part 28, in a position that is different from the insertion bore 28A, in a direction perpendicular to the crankshaft direction CA. A female thread 82A that can be coupled to the bolt 32 is formed in the bore 82. As shown in FIG. 26, the bore 36 in which the one of the bolts 32 can be inserted can be omitted from the adjustment member 34 of the modified example. Further, the locking member 42, and the slit 40 to which the locking member 42 is attached, can be omitted from the adjustment member 34.

Figure 27:
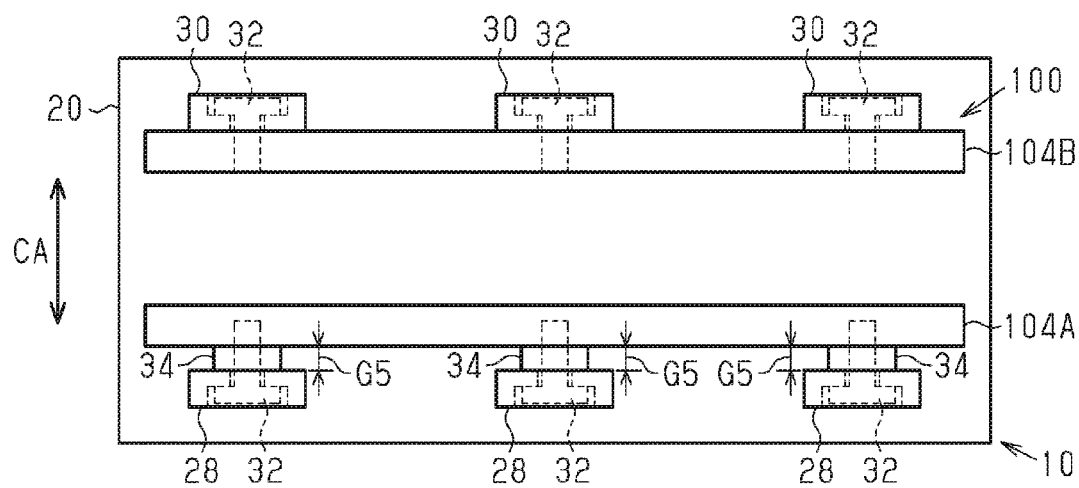
FIG. 27 is a schematic view of a bracket and a first attaching part in accordance with a sixth modified example.

In each of the embodiments and each of the modified examples described above, the first attaching parts 28, 29, 31 and 33 and the second attaching part 30 of the drive unit 10 can be disposed on the outer sides of the first and second flanges 104A and 104B of the bracket 100. That is, the first and second flanges 104A and 104B can be disposed between the first attaching parts 28, 29, 31 and 33 and the second attaching part 30. In this case, for example, as shown in FIG. 27, at least a portion of the adjustment member 34 is positioned in a gap G5 between the first attaching part 28 and the first flange 104A. In the example of FIG. 27, a female thread that screws to the bolt 32 is omitted from the first attaching part 28 and the second attaching part 30, and a female thread that screws to a bolt is formed in the first and second flanges 104A and 104B.

In each of the embodiments and each of the modified examples described above, the plurality of first attaching parts 28, 29, 31 and 33 can be formed connected to each other, and the plurality of second attaching parts 30 can be formed connected to each other.

In each of the embodiments and each of the modified examples described above, the first attaching parts 28, 29, 31 and 33 and the second attaching parts 30 are attached to the bracket 100 by separate bolts; however, the first attaching parts 28, 29, 31 and 33 and the second attaching part 30, which face each other in the crankshaft direction CA, can be affixed to the bracket 100 by one bolt. In this case, a female thread that screws to a bolt is not formed in the first attaching parts 28, 29, 31 and 33, the second attaching part 30, and the adjustment members 34, 44, 54, 74, 84. The first attaching parts 28, 29, 31 and 33 and the second attaching parts 30 can be fastened together with the first and second flanges 104A, 104B with a bolt and a nut.

Figure 28:
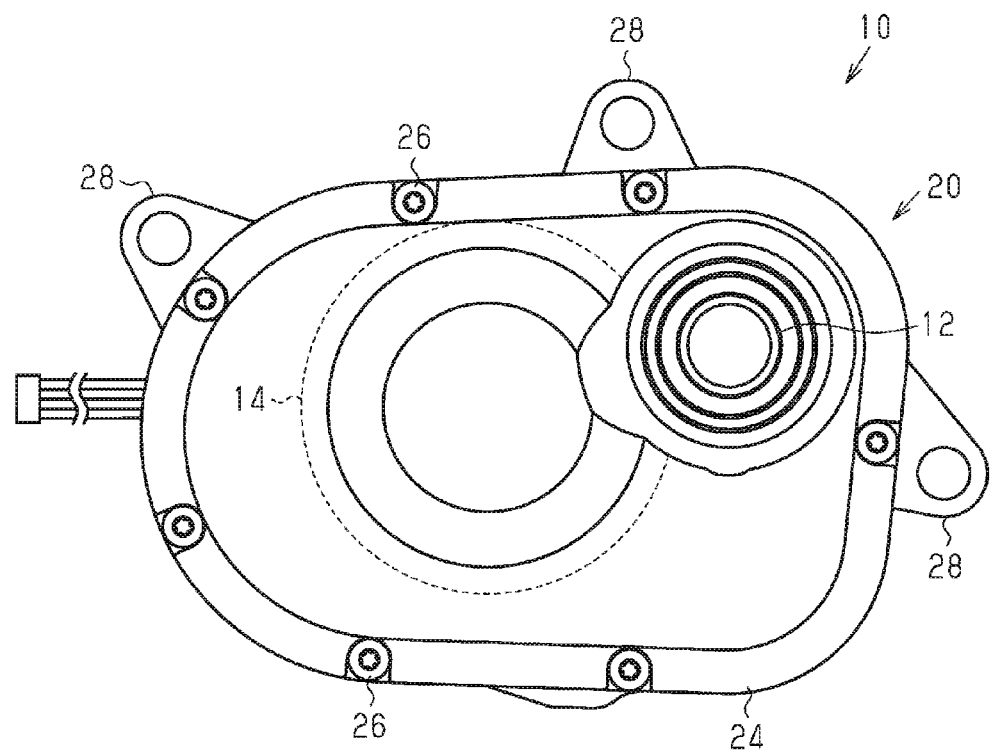
FIG. 28 is a side elevational view of a drive unit of a seventh modified example.

In each of the embodiments and each of the modified examples described above, the drive unit 10 can be any configuration that is equipped with at least one of a motor and a transmission. For example, the transmission 16 can be omitted from the drive unit 10. In this case, as shown in FIG. 28, the drive unit 10 becomes an assist device comprising the motor 14 that assists a manual drive force that is applied to the crankshaft 12. For example, the motor 14 and a decelerator (not shown) which is coupled to the motor 14 can be omitted from the drive unit 10. In this case, the drive unit 10 becomes a transmission that changes the gear ratio of a bicycle.

In the fourth embodiment described above, the recess 33G can be omitted from each of the first attaching part 33.

Figure 29:
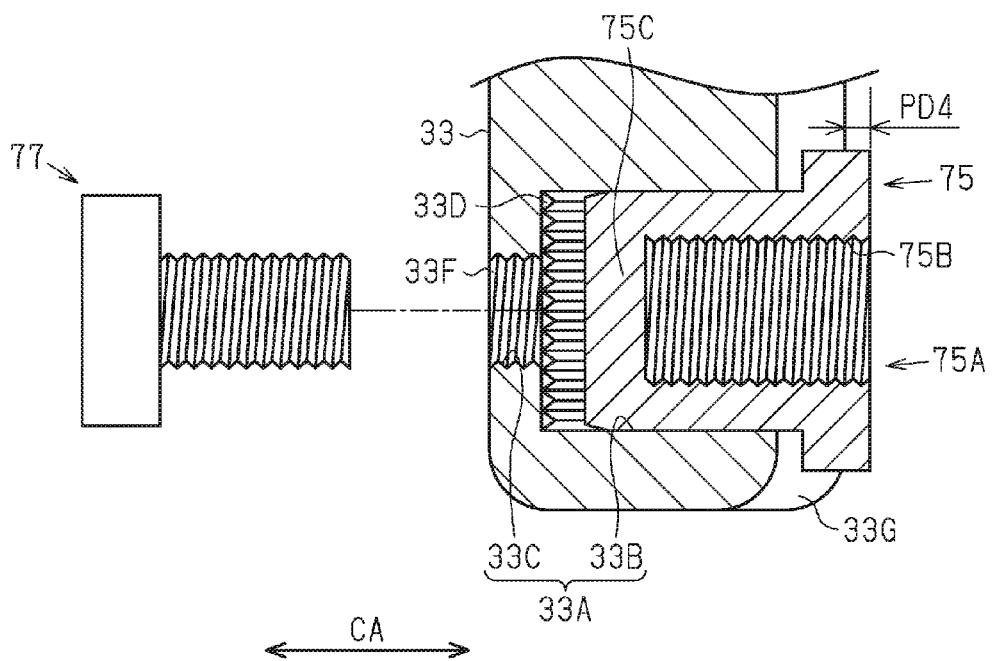
FIG. 29 is a partial cross sectional view of an adjustment member and a first attaching part of an eighth modified example.

In the above-described fourth embodiment, as shown in FIG. 29, the adjustment member 75 can be press fitted in the insertion bore 33A of the first attaching part 33, instead of the adjustment member 84. The adjustment member 75 comprises a bore 75A which does not extend through the adjustment member 75 in the axial direction. A female thread 75B that is coupled to the bolt 32 is formed in the bore 75A. As shown in FIG. 29, an adjustment bolt 77 presses a bottom portion 75C of the adjustment member 75, by screwing the adjustment bolt 77 from the side of the second portion 33C with the insertion bore 33A. Accordingly, it is possible to make an adjustment so as to increase the protrusion amount PD4 of the adjustment member 75 from the first attaching part 33. Meanwhile, the first embodiment can be changed in the same way as shown in FIG. 29. In the embodiment shown in FIG. 29, the female thread 33F can be omitted, and the second portion 33C can be omitted. When omitting the second portion 33C, the first portion 33B can extend through the first attaching part 33, or the first portion 33B cannot extend through the first attaching part 33.

In the fourth embodiment described above, the locking member 42 can be added to the adjustment member 84. In this case, a slit (not shown) for attaching the locking member 42 is formed in the holding portion 86 of the adjustment member 84.

In the fourth embodiment described above, it is not necessary for the second portion 33C to be formed. When omitting the second portion 33C, the first portion 33B can extend through the first attaching part 33, or the first portion 33B cannot extend through the first attaching part 33.

In the above-described first to the third embodiments, each of the second attaching parts 30 and the second flange 104B can be attached by the bolts 32, after attaching each of the first attaching parts 28, 29 or 31 and the first flange 104A by the bolts 32, in the same way as in the fourth embodiment.

In the first embodiment described above, as shown in FIG. 30, an output rotating body 94 for transmitting the rotation of the crankshaft 12 to a rear wheel 93 can be disposed on the outside of the housing 20. The output rotating body 94 is disposed in the drive unit 10 coaxially with the crankshaft 12, and is coupled to an output part (not shown) in which the crankshaft 12 is inserted. The crankshaft 12 is coupled to the output part directly or via a one-way clutch. The output part is rotatable relative to the housing 20. In this manner, the housing 20 rotatably supports the output rotating body 94. The output part can be formed, for example, in a cylindrical shape, and can be not disposed coaxially with the crankshaft 12.

Figure 30:
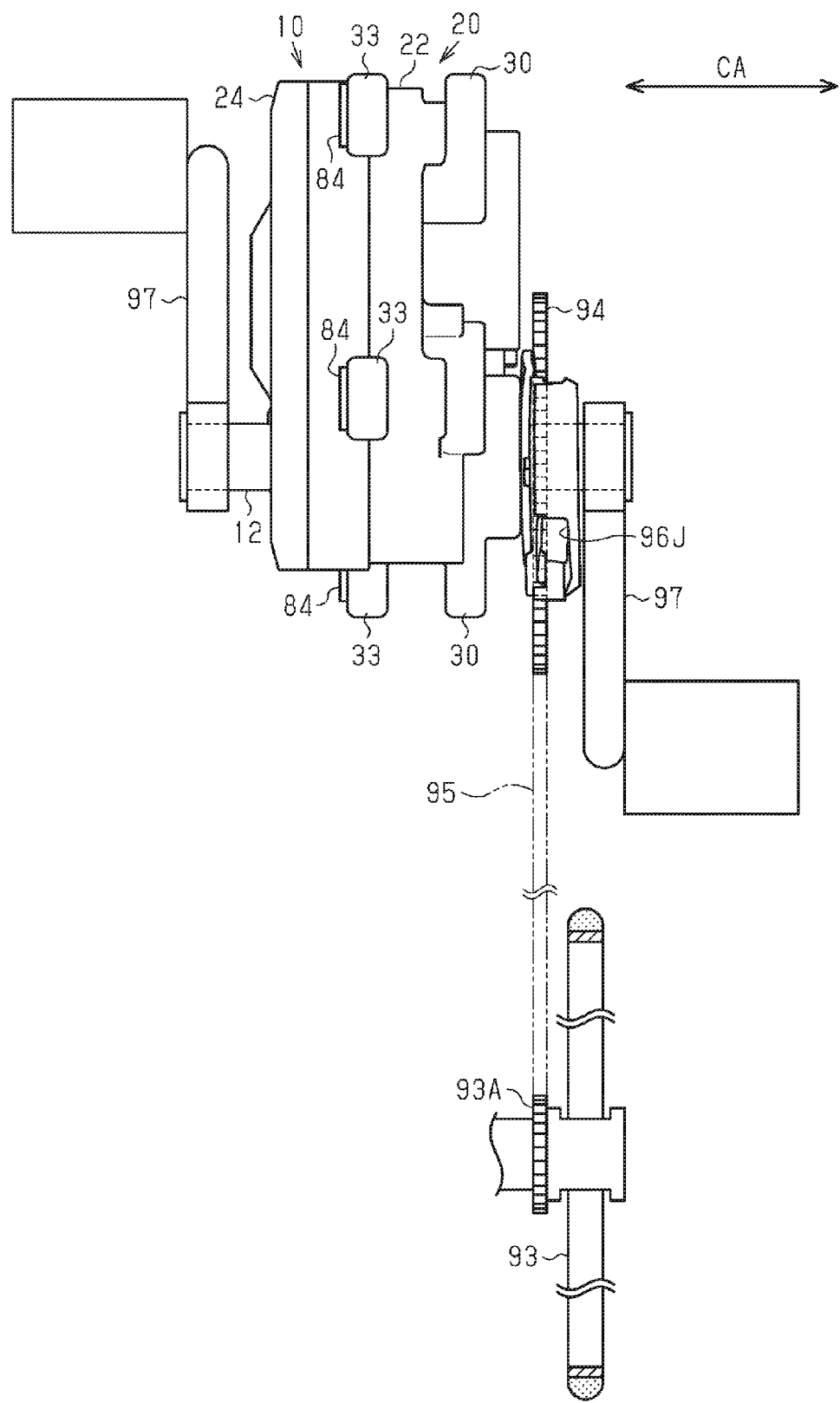
FIG. 30 is a top plan view of a drive unit and peripheral components in accordance with a ninth modified example.

As shown in FIG. 30, one example of the output rotating body 94 is a front sprocket that is connected to a driven rotating body 93A (rear sprocket) of the rear wheel 93 via the chain 95. Meanwhile, the output rotating body 94 can be a front pulley that is connected to the driven rotating body 93A (rear pulley) of the rear wheel 93 via a belt (not shown).

The second attaching parts 30 of the housing 20 are provided closer to the output rotating body 94 than the first attaching parts 28 with respect to the crankshaft direction CA. As shown in FIG. 9, since the second attaching parts 30 are affixed to the second flange 104B by the bolts 32 in a state of being in contact with the second flange 104B of the bracket 100, the position thereof will be a reference position of the drive unit 10 with respect to the bracket 100. Accordingly, the position of the output rotating body 94 relative to the bracket 100 is determined with high accuracy, by the output rotating body 94 (refer to FIG. 30) being attached to the second attaching part 30 side of the housing 20. Therefore, the accuracy of the chain line can be easily ensured. Meanwhile, the output rotating body 94 can be disposed in the same way in the second to the fourth embodiments as well.

Figure 31:
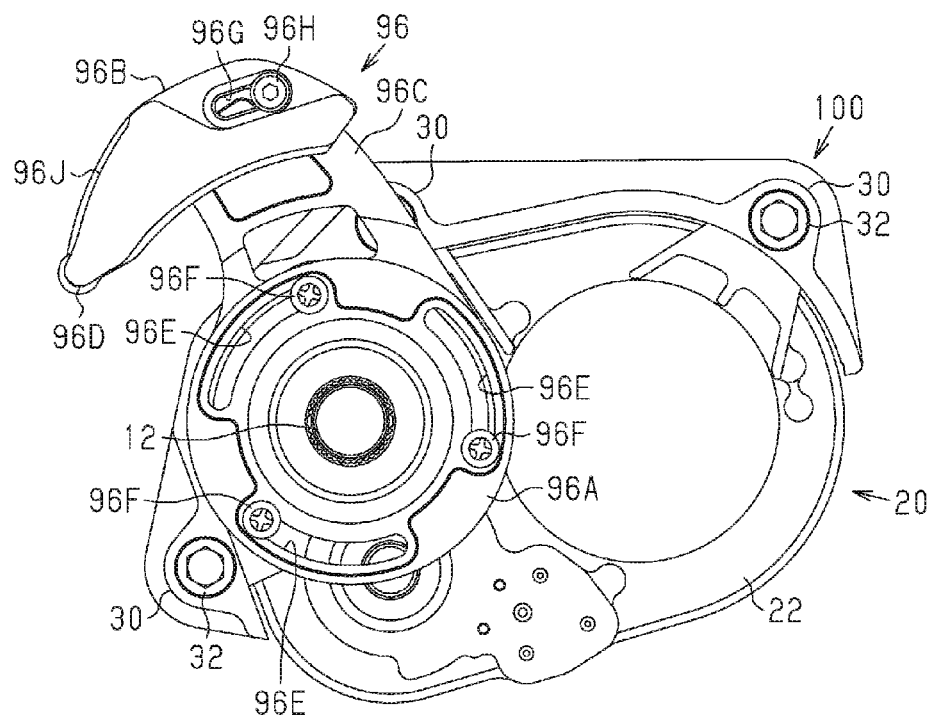
FIG. 31 is a side elevational view of the drive unit in accordance with the ninth modified example.

Further, the chain device 96 for preventing a chain 95 from disengaging from the output rotating body 94 can be disposed on the outside of the housing 20. As shown in FIG. 31, the chain device 96 comprises an attaching part 96A that is attached to the housing 20, a guide 96B that covers a portion of the chain 95, and an arm 96C that couples the attaching part 96A and the guide 96B. The guide 96B comprises a slot 96J (refer to FIG. 30) through which the chain 95 passes. The width of the slot 96J is formed larger than the width of the chain 95. The guide 96B, on both sides of the slot 96J, comprises a pair of guide walls which prevent the chain 95 from falling off from the output rotating body 94. Of the pair of guide walls of the guide 96B, an ends 96D on the upstream side of the traveling direction of the chain 95 are connected to each other. A mechanism that smoothly guides the chain 95 when the chain 95 comes in contact can be provided to the ends 96D. This mechanism can be a roller that is rotatably attached, and at least a portion of the outer peripheral surface can be formed in a circular arc shape. Several arcuate first holes 96E which extend in a direction around the crankshaft 12 are formed in the attaching part 96A. Several holes comprising a female thread that can mount a bolt 96F are provided to the side walls of the housing 20. The attaching part 96A is attached to the housing 20 in a state in which the angle around the crankshaft 12 is adjusted, by the bolt 96F being inserted in the plurality of the first holes 96E and screwed to the housing 20. A second hole 96G is formed in the guide 96B. The second hole 96G is an elongated opening. The guide 96B is attached to the arm 96C in a state in which the position of the guide 96B relative to the arm 96C is adjusted, by a bolt 96H being inserted in the second hole 96G and screwed to the distal end of the arm 96C.

Figure 32:
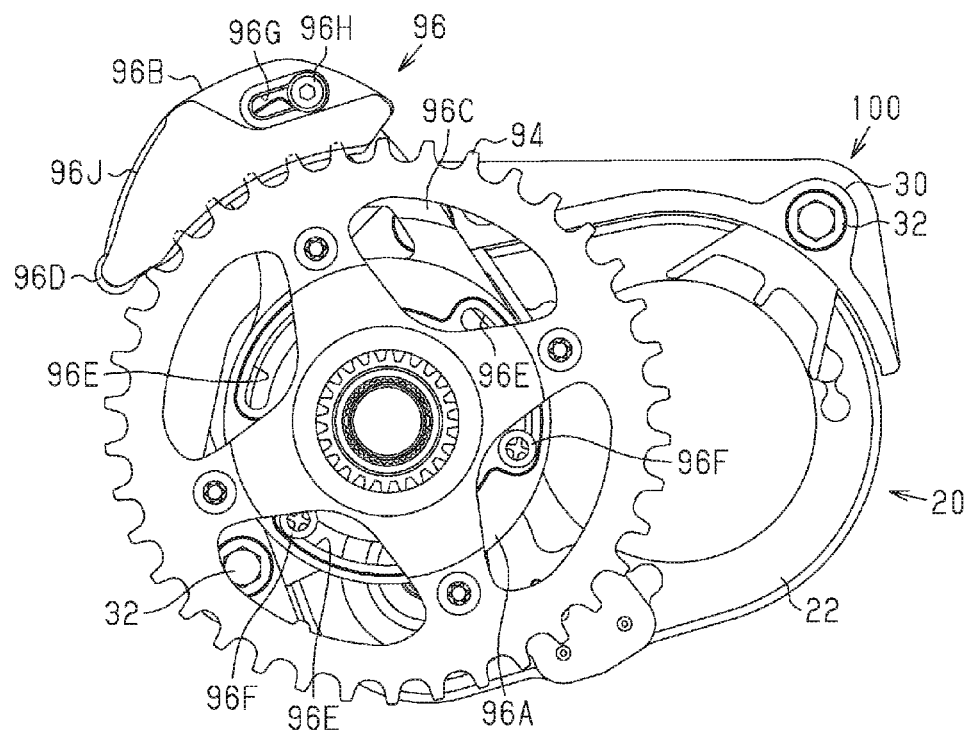
FIG. 32 is a side elevational view of the drive unit in accordance with the ninth modified example.

As shown in FIG. 32, a portion of the output rotating body 94 is disposed in the slot 96J of the chain device 96. The chain device 96 is capable of adjusting the position of the guide 96B by rotating around the crankshaft 12 in the range of the plurality of the first holes 96E, according to the number of teeth of the output rotating body 94. In addition, the position of an end 96D of the guide 96B relative to the chain 95 can be adjusted, by changing the position of the guide 96B with respect to the arm 96C, in the range of the second hole 96G. The guide 96B is provided on the upstream side of the traveling direction of the chain 95 with respect to the output rotating body 94, but can be provided on the downstream side of the traveling direction of the chain 95 with respect to the output rotating body 94. Further, the shape of the guide 96B is not limited to the configuration described above, and can be any configuration that guides the chain 95 or presses the chain 95, so as to prevent the chain 95 from being disengaged from the output rotating body 94. The configuration can be one in which a second hole 96G of the guide 96B is a round hole in which is formed a female thread, and in which the guide 96B is made movable relative to the arm 96C by providing an elongated opening in the arm 96C.

Figure 33:
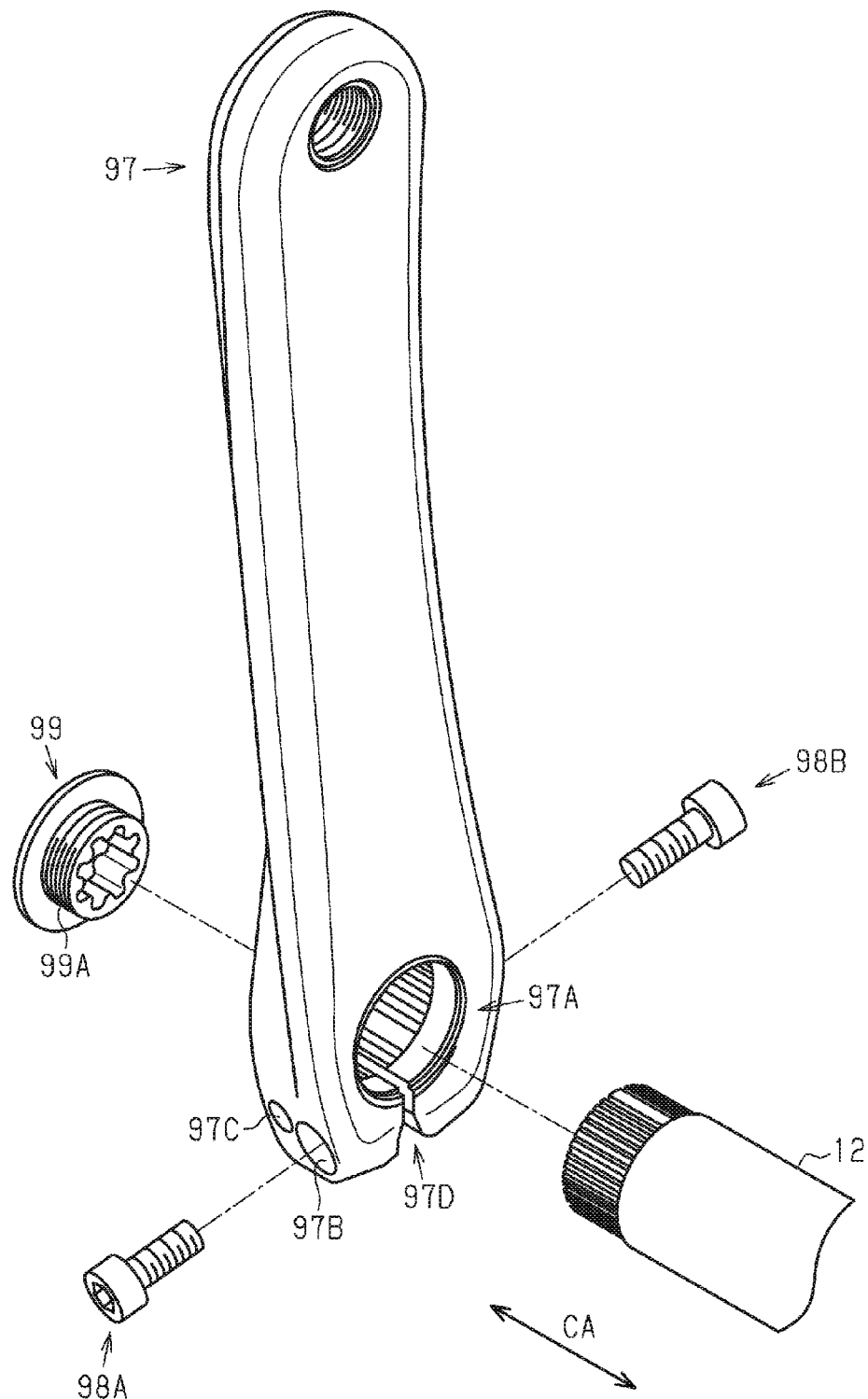
FIG. 33 is an exploded perspective view of a crankshaft and a crank arm in accordance with the ninth modified example.

Further, the crank arm 97 is affixed to the two axial ends of the crankshaft 12 so as to be integrally rotatable with the crankshaft 12. One example of a fixing structure between a pair of crank arms 97 and the crankshaft 12 will be described using FIG. 33. In the drive unit 10, the fixing structures of the left and right crank arms 97 to the crankshaft 12 are the same.

The end of the crank arm 97 to which is attached the crankshaft 12A has a hole 97A a first fixing hole 97B and a second fixing hole 97C. The hole 97A is configured to receive an end of the crankshaft 12. The first fixing hole 97B and the second fixing hole 97C are provided for fastening the crank arm 97 to the crankshaft 12. A slit 97D is formed in a portion of the hole 97A. The slit 97D is notched toward the end of the crank arm 97. The first fixing hole 97B and the second fixing hole 97C extend through the crank arm 97 in the width direction thereof. The width direction of the crank arm 97 is a direction perpendicular to a direction parallel to the crankshaft 12 and to the longitudinal direction of the crank arm 97.

In a state in which an end of the crankshaft 12 is inserted in the hole 97A of the crank arm 97, the crank arm 97 is affixed to the crankshaft 12 by a first fastening bolt 98A being screwed in the first fixing hole 97B, and a second fastening bolt 98B being screwed in the second fixing hole 97C, thereby fastening the crank arm 97 toward the crankshaft 12. A female thread is formed in holes (not shown) on both ends of the crankshaft 12. A cap 99 has a male thread 99A, and is attached to a hole on one of the ends of the crankshaft 12.

In the fourth embodiment, the inner diameter of the second portion 33C of the first attaching part 33 can be formed larger than the bore 90 of the adjustment member 84, and the female thread 90A of the adjustment member 84 can be provided in the range of a hole of the second portion 33C, when viewed from the axial direction of the bolt 32. In this case, the adjustment member 84 can be moved to the second portion 33C side, by screwing the adjustment bolt 92 into the female thread 90A of the adjustment member 84, through the hole in the second portion 33C.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle component comprising:
a housing configured to rotatably support a crankshaft;
a first attaching part coupled to the housing and configured to be attached to a frame; and
an adjustment member having at least a portion configured to be disposed in a gap that is formed between the first attaching part and the frame while in a state in which the first attaching part is attached to the frame, a length of the adjustment member in an axial direction of the crankshaft is larger than a smallest length of the gap between the first attaching part and the frame.

2. The bicycle component as recited in claim 1, wherein the adjustment member is a washer.

3. The bicycle component as recited in claim 2, wherein the first attaching part has a hole, and
the first attaching part is configured to be attached to the frame by a bolt that is disposed in the hole of the first attaching part.

4. The bicycle component as recited in claim 3, wherein the hole of the first attaching part includes a female thread that threadedly engages a thread of the bolt.

5. The bicycle component as recited in claim 3, wherein the bolt is dimensioned to be inserted in the washer.

6. The bicycle component as recited in claim 2, wherein the washer is a tapered washer.

7. The bicycle component as recited in claim 6, wherein the tapered washer has an elongated opening that extends in a tapering direction of the tapered washer.

8. The bicycle component as recited in claim 6, wherein the tapered washer has a first inclined surface that contacts one of the first attaching part and the frame.

9. The bicycle component as recited in claim 8, wherein the first inclined surface is textured to increase a friction resistance of the first inclined surface of the tapered washer.

10. The bicycle component as recited in claim 8, wherein the first attaching part has a second inclined surface that contacts the first inclined surface of the tapered washer.

11. The bicycle component as recited in claim 10, wherein the second inclined surface is textured to increase a friction resistance of the second inclined surface of the first attaching part.

12. A bicycle component comprising:
a housing configured to rotatably support a crankshaft;
a first attaching part coupled to the housing and configured to be attached to a frame; and
an adjustment member having at least a portion configured to be disposed in a gap that is formed between the first attaching part and the frame while in a state in which the first attaching part is attached to the frame, the adjustment member is being adjustably supported to the first attaching part to change a protrusion amount of the adjustment member from the first attaching part.

13. The bicycle component as recited in claim 12, wherein the adjustment member has one of a male thread and a female thread, and
the first attaching part has the other of the male thread and the female thread, which is coupled to the one of the male thread and the female thread of the adjustment member.

14. The bicycle component as recited in claim 13, wherein the first attaching part includes a supporting portion which has a male thread on an outer peripheral, and
the adjustment member includes a nut having a female thread.

15. The bicycle component as recited in claim 12, wherein the first attaching part has a hole, and
the first attaching part is configured to be attached to the frame by a bolt that is disposed in the hole.

16. The bicycle component as recited in claim 15, wherein the adjustment member has a hole in which the bolt can be inserted.

17. The bicycle component as recited in claim 15, wherein the hole of the first attaching part includes a female thread that threadedly engages a thread of the bolt.

18. The bicycle component as recited in claim 12, wherein the first attaching part has an insertion bore, and the adjustment member is press-fitted into the insertion bore of the first attaching part.

19. The bicycle component as recited in claim 18, wherein the adjustment member has a hole, and
the first attaching part is configured to be attached to the frame by a bolt that is disposed in the hole of the adjustment member.

20. The bicycle component as recited in claim 19, wherein the bore of the adjustment member includes a female thread that threadedly engages a thread of the bolt.

21. The bicycle component as recited in claim 18, wherein the adjustment member has an outer periphery with a suppression portion that suppresses movement of the adjustment member relative to the first attaching part.

22. The bicycle component as recited in claim 21, wherein the suppression portion includes knurling that is formed on the outer periphery of an adjustment member.

23. The bicycle component as recited in claim 18, wherein the insertion bore of the first attaching part has a first portion to which the adjustment member is press-fitted, and a second portion having a smaller inner diameter than an inner diameter of the first portion, the second portion has a female thread.

24. The bicycle component as recited in claim 23, wherein the adjustment member has a bore,
the first attaching part is configured to be attached to the frame by a bolt that is disposed in the bore of the adjustment member,
the inner diameter of the second portion is smaller than an inner diameter of the bore of the adjustment member, and
the second portion has a female thread within the bore of the adjustment member when viewed from an axial direction of the bolt.

25. The bicycle component as recited in claim 1, further comprising:
a second attaching part provided to the housing and configured to be attached to the frame in a position that is different from the first attaching part with respect to a direction parallel to an axis of the crankshaft.

26. The bicycle component as recited in claim 25, wherein at least a portion of the adjustment member is disposed on an opposite side of the second attaching part relative to the first attaching part with respect to the direction parallel to the axis of the crankshaft.

27. The bicycle component as recited in claim 25, wherein the housing rotatably supports an output rotating body which is disposed outside the housing and which transmits rotation of the crankshaft to a rear wheel, and
the second attaching part is provided closer to the output rotating body than the first attaching part with respect to the direction parallel to the axis of the crankshaft.

28. The bicycle component as recited in claim 1, further comprising:
a motor that assists a manual drive force that is applied to the crankshaft.

29. The bicycle component as recited in claim 1, further comprising:
a transmission that changes a transmission ratio of a bicycle.

30. A bicycle component comprising:
a housing configured to rotatably support a crankshaft;
a first attaching part coupled to the housing and configured to be attached to a frame; and
an adjustment member having at least a portion configured to be disposed in a gap that is formed between the first attaching part and the frame while in a state in which the first attaching part is attached to the frame, the adjustment member having a holding portion that is held by the first attaching part, and a flange portion that is provided to an end of the holding portion, the flange portion being disposed in the gap that is formed between the first attaching part and the frame.

31. The bicycle component as recited in claim 30, wherein the first attaching part further has a recess that is configured to receive the flange portion.

32. The bicycle component as recited in claim 30, wherein the first attaching part has an insertion bore, and
the holding portion of the adjustment member is press-fitted into the insertion bore of the first attaching part.

* * * * *